(12) United States Patent
Clarner et al.

(10) Patent No.: US 7,806,677 B2
(45) Date of Patent: Oct. 5, 2010

(54) MOLDING APPARATUS AND RELATED SYSTEMS AND METHODS

(75) Inventors: Mark A. Clarner, Concord, NH (US); Christopher M. Gallant, Nottingham, NH (US)

(73) Assignee: Velcro Industries B.V., Curacao (NL)

( * ) Notice: Subject to any disclaimer, the term of this patent is extended or adjusted under 35 U.S.C. 154(b) by 626 days.

(21) Appl. No.: 11/778,271

(22) Filed: Jul. 16, 2007

(65) Prior Publication Data

US 2009/0022840 A1 Jan. 22, 2009

(51) Int. Cl.
B29C 43/46 (2006.01)
B29C 59/04 (2006.01)

(52) U.S. Cl. .................. 425/194; 425/471; 492/30; 492/38

(58) Field of Classification Search ............. 425/194, 425/363, 471; 492/30, 38, 47
See application file for complete search history.

(56) References Cited

U.S. PATENT DOCUMENTS

| | | | | |
|---|---|---|---|---|
| 2,081,724 | A * | 5/1937 | Abbott | ............... 425/194 |
| 2,600,254 | A | 6/1952 | Lysobey | |
| 2,803,040 | A * | 8/1957 | Robert et al. | ............ 425/194 |
| 3,147,528 | A * | 9/1964 | Erb | ................ 24/452 |
| 3,312,583 | A | 4/1967 | Rochlis | |
| 3,507,010 | A | 4/1970 | Doleman et al. | |
| 3,590,109 | A | 6/1971 | Doleman et al. | |
| 3,752,619 | A | 8/1973 | Menzin et al. | |
| 3,760,477 | A * | 9/1973 | Koch | ................. 425/194 |
| 3,762,000 | A | 10/1973 | Menzin et al. | |
| 4,383,670 | A | 5/1983 | Olschewski et al. | |
| 4,775,310 | A | 10/1988 | Fischer | |
| 4,794,028 | A | 12/1988 | Fischer | |
| 5,167,895 | A | 12/1992 | Lueghamer et al. | |
| 5,173,313 | A * | 12/1992 | Sato et al. | ............ 425/194 |
| 5,297,947 | A * | 3/1994 | Cardinali | ............ 425/194 |
| 5,308,235 | A * | 5/1994 | Kamitakahara et al. | ..... 425/194 |
| 5,320,514 | A * | 6/1994 | Kanome et al. | ............ 425/194 |
| 5,800,845 | A | 9/1998 | Akeno et al. | |
| 5,875,527 | A | 3/1999 | Lacey et al. | |
| 5,900,350 | A | 5/1999 | Dowd et al. | |
| 5,922,222 | A | 7/1999 | Jens et al. | |
| 5,971,738 | A | 10/1999 | Jens et al. | |
| 5,980,230 | A | 11/1999 | Buzzell et al. | |
| 6,039,556 | A | 3/2000 | Jens et al. | |
| 6,099,289 | A | 8/2000 | Jens et al. | |
| 6,162,040 | A | 12/2000 | Clune | |

(Continued)

FOREIGN PATENT DOCUMENTS

EP   1042971 A1   11/2000

(Continued)

OTHER PUBLICATIONS

International Search Report and Written Opinion; PCT/US2008/059772; mailed Sep. 17, 2008.

*Primary Examiner*—James Mackey
(74) *Attorney, Agent, or Firm*—Fish & Richardson P.C.

(57) ABSTRACT

This invention relates to molding apparatus and related systems and methods. In one aspect of the invention, a mold roll, assembly includes an inner member and multiple molding tools disposed about a circumference of the inner member, each molding tool including at least one molding plate that at least partially defines a molding cavity.

53 Claims, 21 Drawing Sheets

U.S. PATENT DOCUMENTS

| | | | |
|---|---|---|---|
| 6,163,939 | A | 12/2000 | Lacey et al. |
| 6,202,260 | B1 | 3/2001 | Clune et al. |
| 6,258,311 | B1 | 7/2001 | Jens et al. |
| 6,280,670 | B1 | 8/2001 | Buzzell et al. |
| 6,287,665 | B1 | 9/2001 | Hammer |
| 6,432,339 | B1 | 8/2002 | Jens et al. |
| 6,533,981 | B1 | 3/2003 | Jens et al. |
| 6,640,348 | B1 | 11/2003 | Provost et al. |
| 6,716,017 | B2 * | 4/2004 | Papadopoulas ............. 425/194 |
| 6,902,389 | B2 | 6/2005 | Gorman et al. |
| 7,021,918 | B1 * | 4/2006 | Reum, Sr. ................... 425/194 |
| 7,029,265 | B2 | 4/2006 | Plammer |
| 7,192,266 | B2 | 3/2007 | Gallant et al. |
| 7,217,119 | B2 | 5/2007 | Clune et al. |
| 2001/0000117 | A1 | 4/2001 | Gorman et al. |
| 2002/0022108 | A1 | 2/2002 | Krantz et al. |
| 2002/0190418 | A1 | 12/2002 | Jens et al. |
| 2003/0012921 | A1 | 1/2003 | Gallant et al. |
| 2003/0034583 | A1 | 2/2003 | Provost |
| 2005/0000066 | A1 | 1/2005 | Ducauchuis |
| 2006/0023463 | A1 | 2/2006 | Bigge et al. |
| 2006/0066002 | A1 | 3/2006 | Gallant et al. |
| 2007/0029695 | A1 | 2/2007 | Gallant et al. |

FOREIGN PATENT DOCUMENTS

| | | |
|---|---|---|
| EP | 1640133 | 3/2006 |
| JP | 8249729 | 9/1996 |
| WO | WO 03/051148 | 6/2003 |
| WO | WO 2006/125064 | 11/2006 |

\* cited by examiner

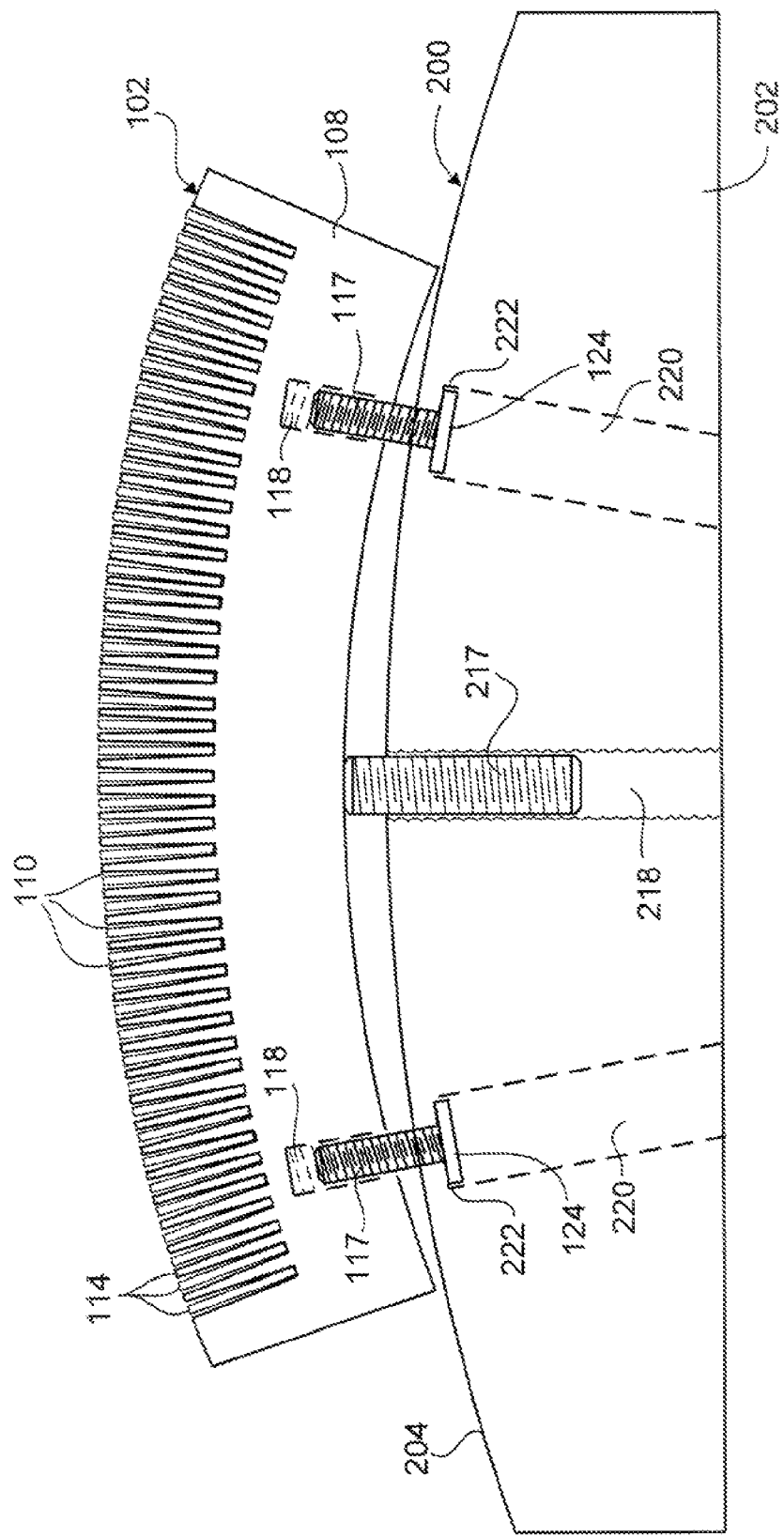

MOLDING APPARATUS AND RELATED SYSTEMS AND METHODS

TECHNICAL FIELD

This invention relates to molding apparatus and related systems and methods.

BACKGROUND

Fastener products, such as hook components of hook and loop fasteners, or other projections for releasable engagement into a cooperating material, can be manufactured by a continuous molding method employing a mold roll that has fastener-shaped mold cavities formed in its periphery. The mold roll can be formed of an axially compressed stack of ring-form mold plates. In operation, molten polymer from an extruder can be introduced into a pressure nip to force the molten polymer under high pressure into the fastener cavities of the mold roll to mold fastener elements (e.g., hooks or stems). At the same time, the mold roll can form a sheet-form base from which the fastener elements extend.

SUMMARY

In one aspect of the invention, a mold roll assembly includes an inner member and multiple molding tools disposed about a circumference of the inner member. Each molding tool includes at least one molding plate disposed within a slot defined by a base of the molding tool, and the at least one molding plate at least partially forms a molding cavity.

In another aspect of the invention, a mold roll assembly includes an inner member and multiple molding tools disposed about a circumference of the inner member. Each molding tool includes multiple molding plates arranged in a stack, and each of the molding plates at least partially forms a molding cavity.

In an additional aspect of the invention, a mold roll assembly includes multiple molding plates arranged circumferentially about an axis of rotation of the mold roll assembly, and at least some of the molding plates form a molding cavity. The mold roll assembly further includes an end ring defining a recess configured to receive end portions of molding plates therein and members disposed within circumferentially spaced bores defined by the end ring. The members are configured to be moved radially inward and radially outward within the bores, and each member is arranged to contact the end portion of one or more molding plates such that the member can be used to adjust a radial position of the one or more molding plates that the member is adapted to contact.

In a further aspect of the invention, an apparatus includes a base having a peripheral surface, a member extending radially outward from the base such that a molding tool defining a plurality of slots can be disposed adjacent the base with the member contacting an inner surface of a central portion of the molding tool, and at least one mechanical fastener configured to engage end regions of the molding tool when the molding tool is disposed adjacent the base so that the end regions of the molding tool can be drawn radially inward toward the base, causing the slots to widen.

In another aspect of the invention, a method includes applying a radially outward force to a central portion of a molding tool defining a plurality of slots, the radially outward force causing the slots of the molding tool to widen. The method also includes disposing a molding plate within at least some of the slots of the molding tool while the radially outward force is applied to the central portion of the molding tool. The molding plates at least partially form a molding cavity.

In an additional aspect of the invention, a method includes disposing end portions of molding plates within a recess defined by an end ring. The end portion of each of the molding plates has a height less than a height of a central section of each of the molding plates. The method also includes altering the radial position of at least one of the molding plates by engaging the end portion of the at least one molding plate with a member extending radially inward from the end ring.

Embodiments can include one or more of the following features.

In some embodiments, the base of each molding tool defines multiple slots, and a molding plate is disposed within each of the slots.

In certain embodiments, the inner member includes a projection adapted to extend radially outward from the inner member, and the projection is arranged to contact a central portion of an inner surface of the base of one of the molding assemblies.

In some embodiments, the projection is radially displaceable within a bore defined by the inner member.

In certain embodiments, the slot extends transversely across the mold roll assembly.

In some embodiments, at least some of the molding tools include a plurality of molding plates and spacer plates, and the spacer plates are disposed between adjacent molding plates.

In certain embodiments, at least some of the spacer plates are tapered.

in some embodiments, each of the molding tools is secured to the inner member.

In certain embodiments, each of the molding tools is secured to the inner member with at least one mechanical fastener (e.g., with at least one screw).

In some embodiments, circumferentially adjacent molding tools are secured to one another.

in certain embodiments, the mold roll assembly further includes a drum around which the inner member is disposed.

In some embodiments, the inner member is a ring.

In certain embodiments, the molding cavity includes a crook portion.

In same embodiments, the crook portion of the molding cavity extends in a direction transverse to the mold roll assembly.

In certain embodiments, the molding tools are releasably secured to the inner member.

In some embodiments, the mold roll assembly further includes multiple mechanical fasteners extending radially outward from fee inner member, and each mechanical fastener being configured to be releasably fastened to a corresponding one of the molding tools.

In certain embodiments, the multiple mechanical fasteners are screws, and the multiple molding tools define threaded bores configured to receive the screws.

In some embodiments, the molding tools further include multiple spacer plates, and each of the spacer plates is disposed between adjacent molding plates.

In certain embodiments, the spacer plates cooperate with the molding plates to define the molding cavities.

In some embodiments, a mechanical fastener extends within a bore defined by each of the molding tools, and the mechanical fastener secures adjacent molding tools together.

In certain embodiments, the bore is threaded.

In some embodiments, the mechanical fastener is a screw.

In certain embodiments, each molding tool further includes a base defining a slot in which the multiple molding plates are disposed.

In some embodiments, the mold roll assembly further includes an L-shaped plate having a portion that overhangs an end portion of the base.

In certain embodiments, the portion of the L-shaped plate that overhangs the end portion of the base at least partially defines a molding cavity.

In some embodiments, the mold roll assembly further includes an end ring defining a recess configured to receive end portions of the molding plates.

In certain embodiments, the end ring includes a radially moveable member adapted to contact the end portion of one or more of the molding plates to enable a radial position of the one or more molding plates to be adjusted.

In some embodiments, the inner member is a drum.

In certain embodiments, the inner member is a ring.

In some embodiments, the molding cavity includes a crook portion extending in a direction transverse to the mold roll assembly.

In certain embodiments, the members are screws.

In some embodiments, the mold roll assembly further includes a ring disposed between the members and the end portions of the molding plates.

In certain embodiments, the member is radially moveable within a bore defined by the base.

In some embodiments, the base includes an inner member of a mold roll assembly.

In certain embodiments, applying a radially outward force to the central portion of the molding tool includes moving end regions of the molding tool radially inward while substantially preventing the central portion of the molding tool from moving radially inward.

In some embodiments, moving the end region of the molding tool radially inward includes screwing a screw into a threaded recess defined by the end regions of the molding tool.

In certain embodiments, substantially preventing the central portion of the molding tool from moving radially inward includes contacting the central portion of the molding tool with a member extending radially outward from a base.

In some embodiments, the method further includes removing the radially outward force from the central portion of the molding tool after disposing the molding plate within the slots.

In certain embodiments, the recess is an annular groove.

In some embodiments, the member is radially moveable within a bore defined by the end ring.

In certain embodiments, the bore is threaded and the member is a screw disposed within the threaded bore.

In some embodiments, the end ring includes multiple radially moveable members disposed within circumferentially spaced bores defined by the end ring.

In certain embodiments, altering the radial position of at least one of the molding plates includes altering the position of one to five molding plates.

In some embodiments, a ring is disposed between the member and the end portion of the at least one molding plate.

In certain embodiments, the ring distributes a force resulting from the engagement of the end portion of the at least one molding plate with the member across multiple molding plates.

Embodiments can include one or more of the following advantages.

In some embodiments, a mold roll assembly includes multiple different molding tools arranged circumferentially around the periphery of the mold roll assembly. In such embodiments, each of the individual molding tools is removable from the mold roll assembly. Thus, if one of the molding tools becomes damaged during use, the damaged molding tool can be removed and replaced without having to replace the entire mold roll assembly. Thus, this arrangement can reduce the downtime and cost associated with making repairs to the mold roll assembly.

In certain embodiments, a molding tool bending assembly includes a member (e.g., a screw) that contacts a central region of a molding tool when the molding tool is positioned adjacent (e.g., atop) the bending assembly. The member can be arranged to substantially prevent the central region of the molding assembly from moving radially inward toward the bending assembly when end regions of the molding tool are drawn radially inward toward the bending assembly. As a result, as the end regions of the molding tool are forced radially inward toward the bending assembly, transverse slots defined by the molding tool become temporarily widened. This can increase the ease with which molding plates can be disposed within the slots of the molding tool. As a result the incidence of deforming and/or breaking molding plates when loading the molding plates into the slots of die molding tool can be reduced.

In some embodiments, an inner member (e.g., an inner ring) of a mold roll assembly includes radially moveable members that can be configured to contact central portions of molding tools as the molding tools are secured to the inner member. As a result, the inner member of the mold roll assembly itself can act as a bending assembly to temporarily widen slots of the molding tools, allowing molding plates to be inserted into the slots of the molding tool with greater ease. This arrangement can reduce the time required to prepare and assemble the mold roll assembly.

In certain embodiments, multiple mold roll assemblies are stacked together in a side by side arrangement to enable the resulting molding apparatus to form wider fastener products. In certain embodiments, the molding tools of the various mold roll assemblies can be scoured to the mold roll assembly without the use of end rings. As a result, regions m the resulting fastener product having no fastener elements (e.g., regions that may have resulted from those areas of the mold roll assembly including end rings) can be reduced in size or even prevented.

In some embodiments, the mold roll assembly includes an end ring having a recess in which end portions of molding plates are received. Members (e.g., screws) are arranged in a circumferentially spaced pattern around the end ring. The members can be manipulated to move in a direction substantially perpendicular to the longitudinal axis of the mold roll assembly (i.e., to move radially inward and radially outward). Thus, the members can apply pressure to the end portions of associated molding plates when moved radially inward and can reduce pressure on the end portions of associated molding plates when moved radially outward. As a result, the radial position of a particular mold plate or a particular grouping of mold plates can be adjusted by manipulating the members of the end ring. This can be particularly advantageous when only one mold plate or a small cluster of molding plates is radially out of position relative to the remainder of the molding plates of the mold roll assembly Arranging each of the molding plates in substantially the same radial position can help to provide the mold roll assembly with a smooth peripheral surface, which can help to ensure that fastener products formed using the mold roll assembly have relatively smooth bases.

Other aspects, features, and advantages are in the claims.

DESCRIPTION OF DRAWINGS

FIGS. 5A-5D illustrate a method, and apparatus for loading molding plates into slots of a molding tool.

DETAILED DESCRIPTION

Figure 1:
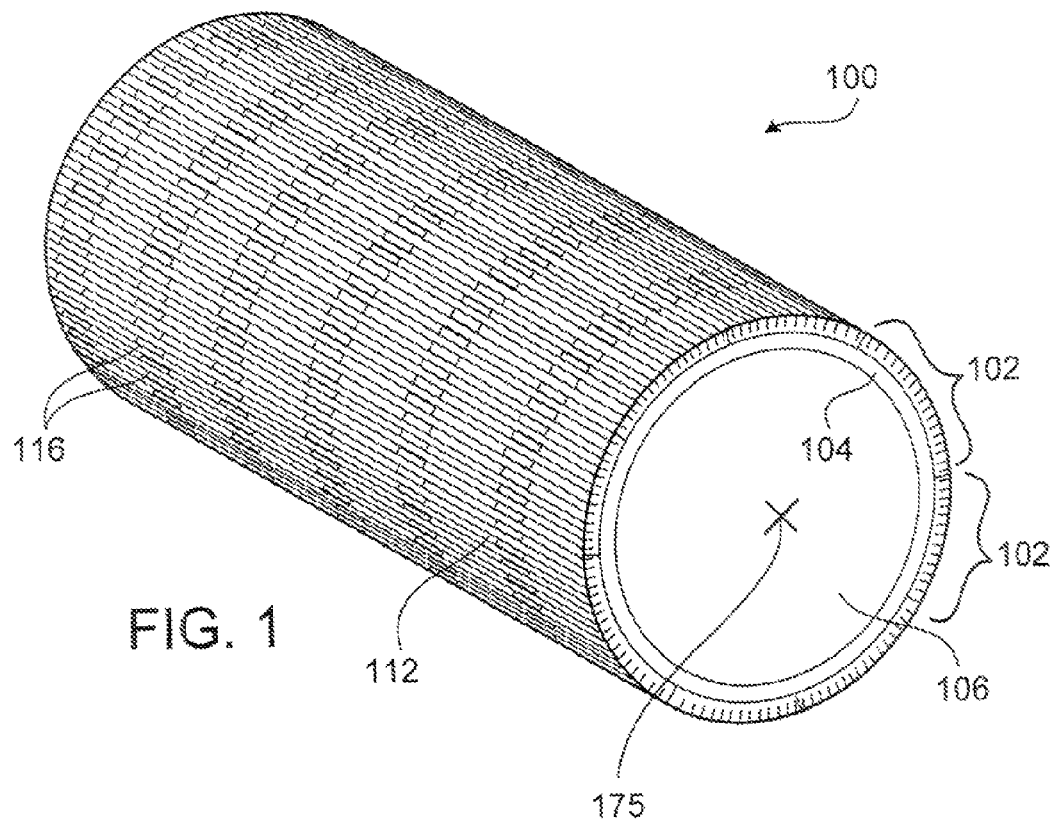
FIG. 1 is a perspective view of a mold roll assembly
Figure 2:
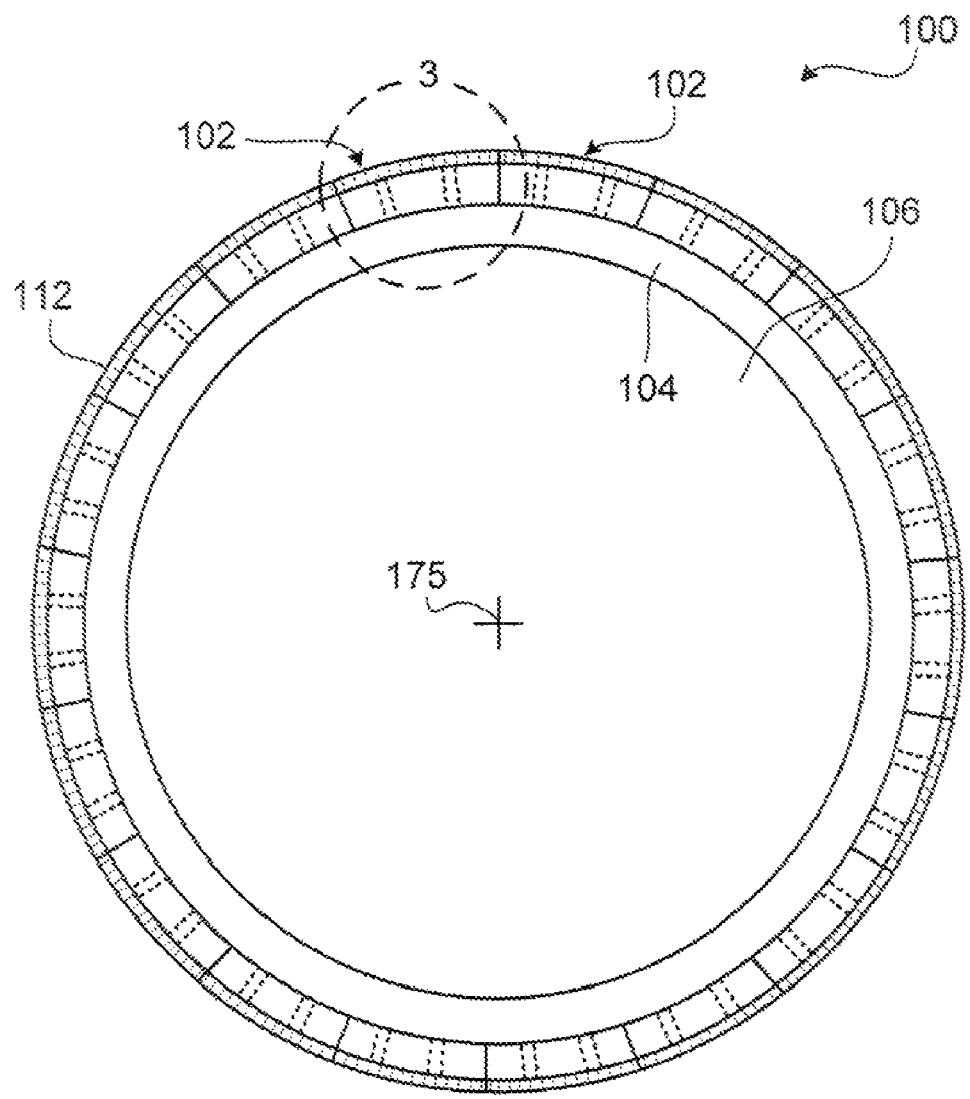
FIG. 2 is a side view of the mold roll assembly of FIG. 1.

Referring to FIGS. 1 and 2, a mold roll assembly 100 includes multiple molding tools 302 disposed circumferentially about an inner ring 104. Inner ring 104 is disposed around a dram 106. Each of molding tools 102 extends transversely across inner ring 104 and is secured to inner ring 104, as described in more detail below; Each of molding tools 102 includes an arcuate base 108 in which multiple, circumferentially spaced apart slots 110 are formed (shown in FIG. 3). Slots 110 extend from one side of molding tool 102 to an opposite side of molding tools 102. Molding plates 114 are securely retained within slots 110 of base 108 (e.g., by being press fit within slots 110). Molding plates 114 cooperate with surfaces of base 108 adjacent slots 110 to form hook-shaped molding cavities 116, which extend inward from peripheral surface 112 of mold roll assembly 100. Mold roll assembly 100 can be used to mold fastener products that include multiple hook-shaped fastener elements extending from a base in a transverse or cross-machine direction relative to the base. For example, as described in more detail below, molten polymer resin can be introduced at high pressure to peripheral surface 112 of mold roll assembly 100 so that some of the molten resin enters molding cavities 116 to mold hook-shaped fastener elements, while the remaining portion of the molten resin is pressed against peripheral surface 112 of mold roll assembly 100 to form a resin base from which the molded fastener elements extend.

Still referring to FIGS. 1 and 2, molding tools 102 are arranged about inner ring 104 in a manner such that the molding surface (i.e., peripheral surface 112) of mold roll assembly 100 is substantially, circumferentially continuous. Molding tools 102 can, for example, be arranged such that a space of about 0.001 inch or less (e.g., about 0.0001 inch or less) exists between adjacent molding tools 102. Typically, the circumferential ends of adjacent molding tools 102 abut one another so that substantially no space exists between adjacent molding tools 102. The closeness with which adjacent molding tools 102 are positioned relative to one another can help to prevent flashing (e.g., can help to prevent molten resin from entering spaces between adjacent molding tools) when using mold roll assembly 100 to make fastener products. In addition, inner surfaces of arcuate bases 108 of molding tools 102 closely mate with an outer surface of inner ring 104. This helps to ensure that the outer surfaces (e.g., top surfaces) of each of molding tools 102 extend the same distance from inner ring 104, and thus helps to provide mold roll assembly 100 with a smooth molding surface. In addition, contact between arcuate bases 108 and inner ring 104 can help to remove heat from arcuate bases 108 during use. This can increase the rate at which resin cools within molding cavities 116.

When all of the molding tools 102 are disposed around inner ring 104, as shown in FIGS. 1 and 2, they form a substantially continuous molding ring having multiple removeable segments. Because each of molding tools 102 can be individually removed from inner ring 104, it is relatively easy to replace one of the molding tools 102 if it becomes damaged. For example, rather than having to replace the entire mold roll assembly 100 in the event that a discrete region of the mold roll assembly 100 becomes damaged, the damaged molding tool(s) 102 of mold roll assembly 100 alone can be removed and replaced.

Figure 3:
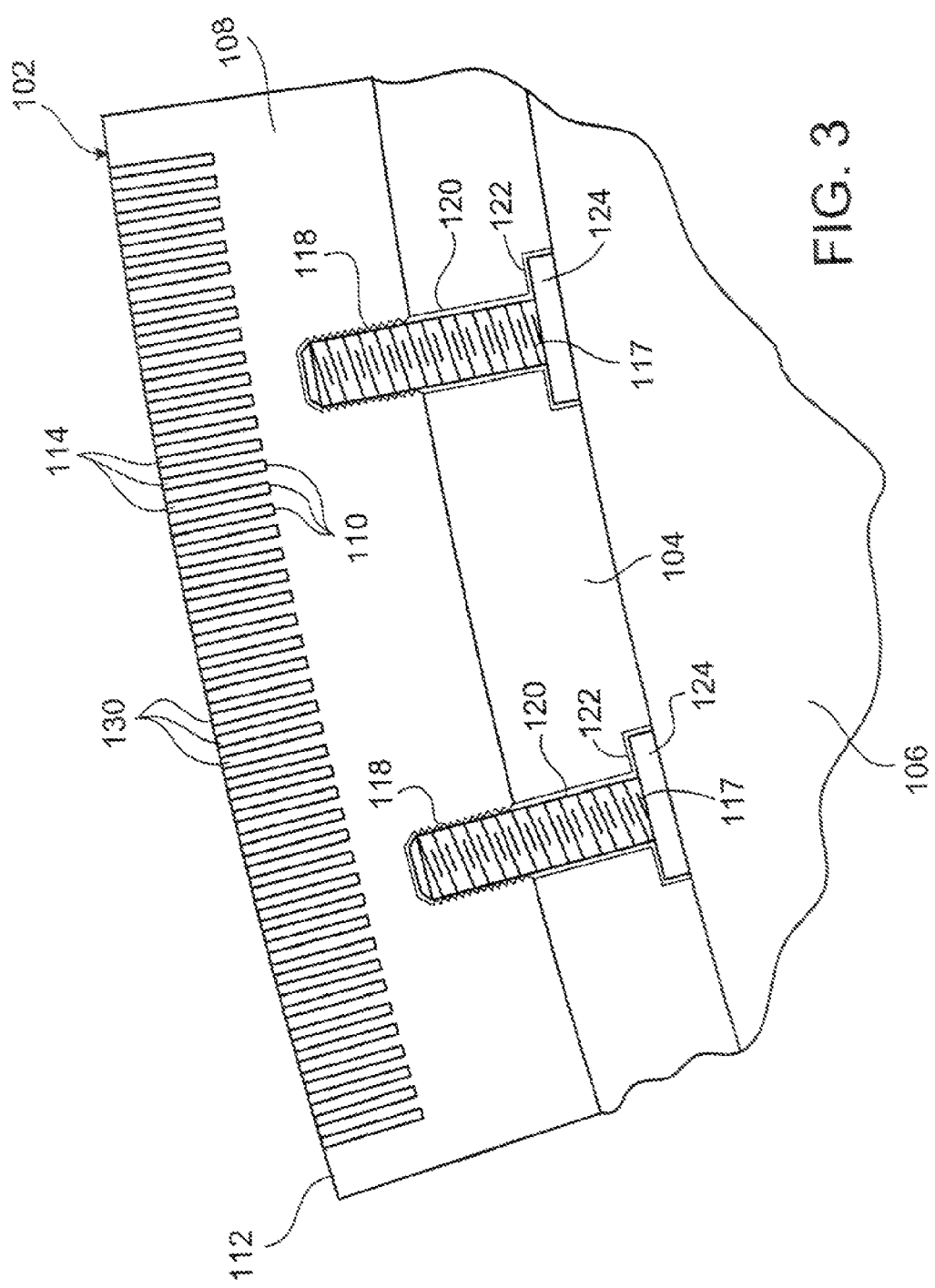
FIG. 3 is an enlarged view of region 3 in FIG. 2.

FIG. 3 illustrates the manner in which molding tools 102 are releasably secured to inner ring 104. Referring to FIG. 3, each molding tool 102 of mold roll assembly 100 is secured to inner ring 104 in a substantially fixed radial and circumferential position with set screws 117. Set screws 117 include threads that engage threaded recesses 118 in base 108 of molding tool 102. Inner ring 104 also includes through bores 120 that align with threaded recesses 118 and through which set screws 117 extend. Each of bores 120 includes a lip 122 that engages a head 124 of its associated set screw 117 when set screws 117 are fully screwed into their associated threaded recess 118 in molding tool 102. The interaction between beads 124 of set screws 117 and lips 122 of bores 120 allows molding tool 102 to be tightly compressed against inner ring 104 when set screws 117 are tightened. Lip 122 is recessed from the inner surface of inner ring 104 such that heads 124 of set screws 117 do not extend beyond the inner surface of inner ring 104. As a result, the inner surface of inner ring 104 and the outer surface of drum 106 fit flush, without being impeded by set screws 117.

Figure 4:
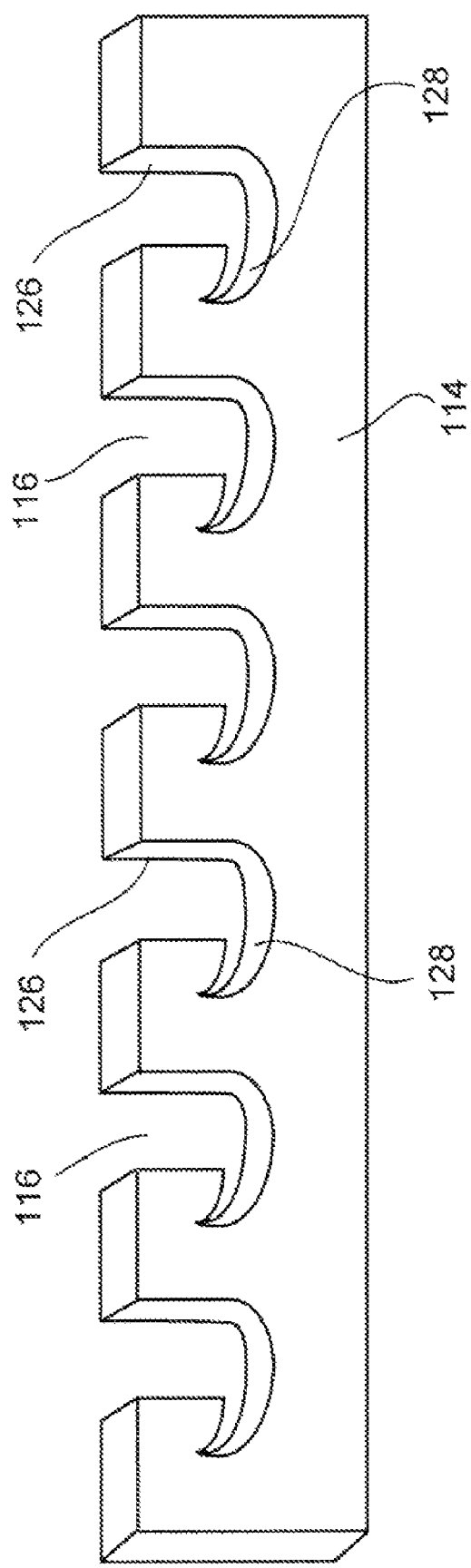
FIG. 4 is a perspective view of a molding plate including multiple book-shaped cavities.

Molding plates 114, as shown in FIG. 4, partially form multiple hook-shaped molding cavities 116 that extend from one-side of molding plate 114 to an opposite side of molding plate 114. Each of the hook-shaped molding cavities 116 includes a stem portion 126 and a crook portion 128. Molding plates 114, when disposed within slots 110 of molding tool 102, as shown in FIGS. 1-3, cooperate with surfaces of base 108 adjacent slots 110 of molding tool 102 to completely define molding cavities 116. This configuration allows hook-shaped fastener elements to be molded within molding cavities 116 when molten resin is introduced into molding cavities 116 and allowed to cool and harden. When molding plates 114 are disposed within slots 110 of molding tool 102 crook portions 128 of molding cavities 116 extend in a transverse direction of molding tool 102 and mold roll assembly 100. This allows for molding of fastener elements having crook portions extending (e.g., from rear to front) in a cross-machine direction (i.e., transverse to mold roil assembly 100 and perpendicular to the machine direction), as discussed below. Such orientation can be useful for resisting loads applied to the fastener product in the cross-machine direction.

Figure 5A:
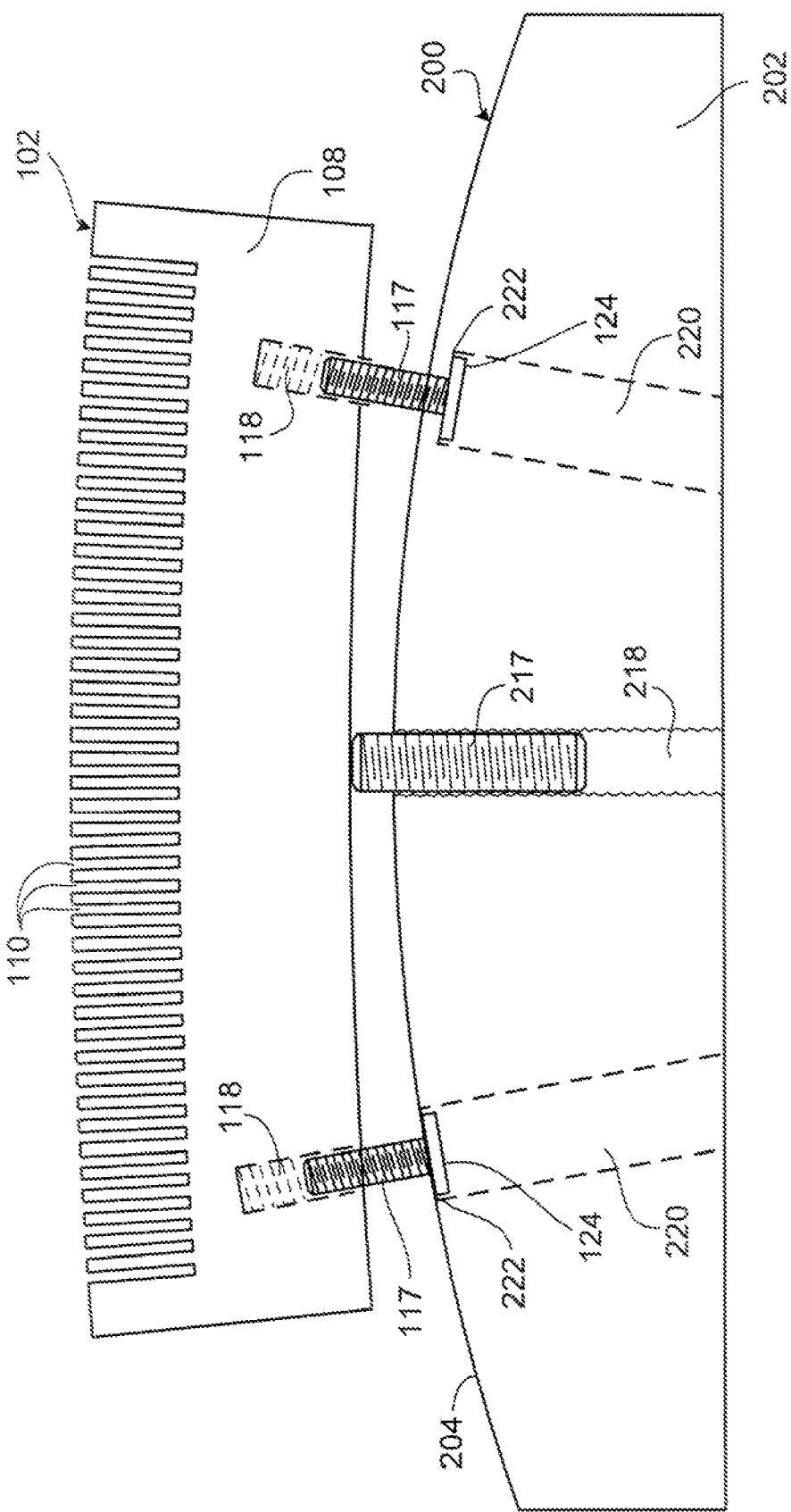

FIGS. 5A-5D illustrate a method of installing molding plates 114 in slots 110 of molding tool 102. As shown in FIG. 5A, to load molding plates 114 into slots 110, molding tool 102 is disposed adjacent (e.g., atop) a molding tool bonding assembly 200. Bending assembly 200 includes a base 202 having a rounded upper surface 204. Base 202 of bending assembly 200 includes through bores 220 that align with threaded recesses 118 of molding tool 102 when molding tool 102 is disposed in a desired position adjacent bending assembly 200. After positioning molding tool 102 in a desired position adjacent bending assembly 200, set screws 117 are inserted through bores 220 and screwed into threaded recesses 118 of molding tool 102. Each of through bores 220 includes a lip 222 that engages head 124 of set screw 117 when set screw 117 is fully inserted into bore 220. The interaction between lip 222 of bore 220 and head 124 of set screw 117 limits the radial outward travel of set screw 117 as it is screwed, into its associated threaded recess 118 in molding tool 102, and thus allows end regions of molding tool 102 to be drawn inwardly toward bending assembly 200 as set screws 117 are screwed into their associated threaded recesses 118. Bending assembly 200 also includes a limiting screw 217 that, during the bending process, is held in a substantially fixed radial position within a threaded bore 218 in base 202 of bending assembly 200. An end of limiting screw 217 extends radially outward from upper surface 204 of base 202 of bending assembly 200. The top surface of limiting screw 217 contacts an inner surface of a central region of base 108 of molding tool 102.

Figure 5B:
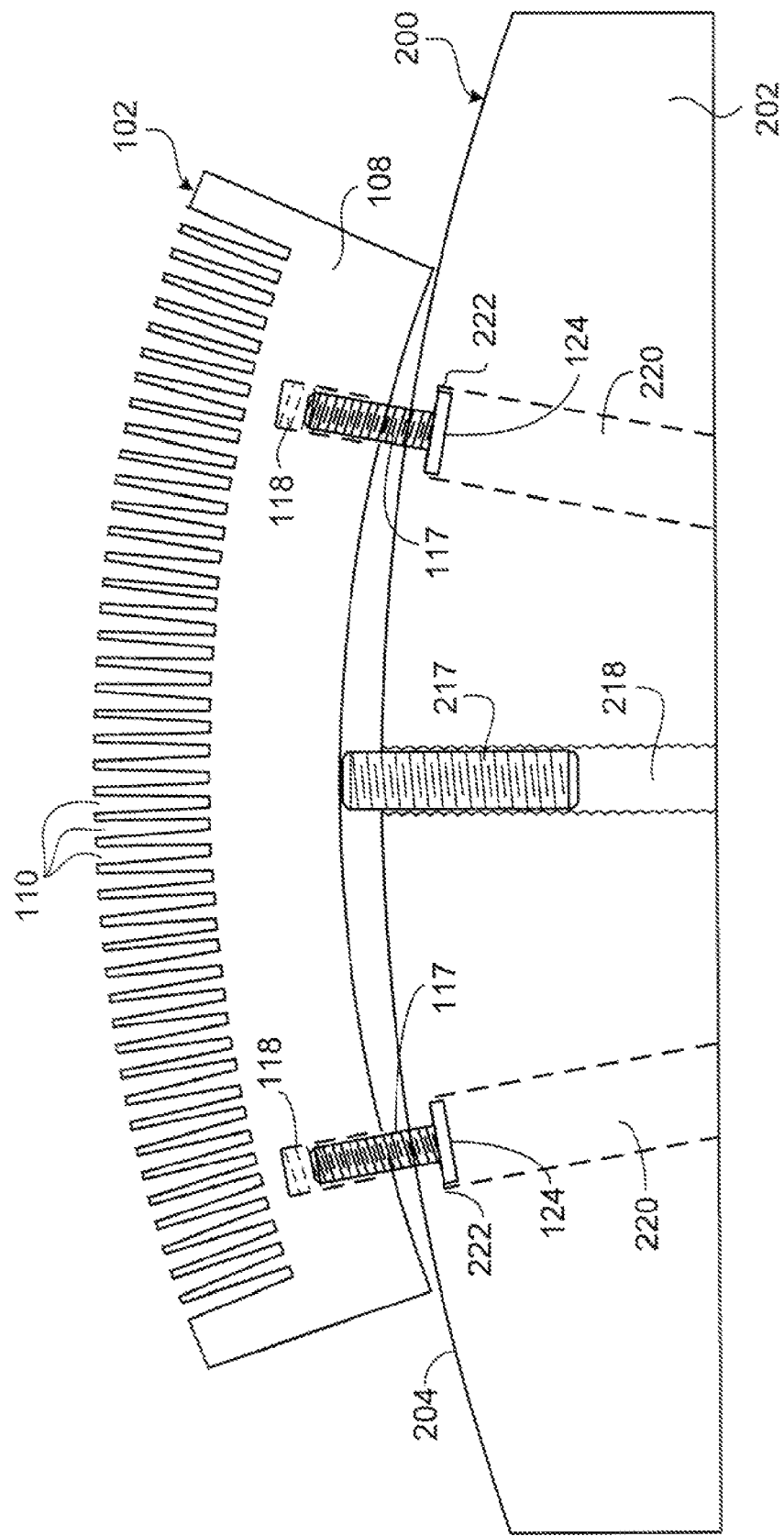

Referring to FIG. 5B, as set screws 117 are screwed into threaded recesses 118 of molding tool 102, the end regions of molding tool 102 are drawn toward base 202 of bending assembly 200. At the same time, limiting screw 217 substantially prevents the central region of molding tool 102 from being drawn radially inward toward bending assembly 200. As a result, the peripheral surface of molding tool 102 lengthens, causing transverse slots 110 of molding tool 102 to widen. The degree to which slots 110 are widened is a function of how far set screws 117 are screwed into threaded recesses 118 of molding tool 102 and how far limiting screw 217 extends above bending assembly 200. To increase the width of slots 110, for example, the user can tighten set screws 117 and/or increase the distance to which limiting screw 217 extends above bending assembly 200 (e.g., by turning limiting screw 217 within-threaded recess 218). The user screws set screws 117 into threaded recesses 118 of molding tool 102 and/or adjusts the radial position of limiting screw 217 until slots 110 of molding tool 102 are widened to a desired width. Slots 110 can, for example, be widened such that uppermost regions of slots 110 (i.e., the regions of slots 110 nearest the peripheral surface of molding tool 102) have a width of about 0.005 inch to about 0.025 inch (e.g., about 0.007 inch to about 0.014 inch).

As shown in FIG. 5C, after widening slots 110, as desired, molding plates 114 are inserted into slots 110. Molding plates 114 can, for example, be lowered into slots 110 from above base 108 or can be slid into slots 110 from the side of base 108. Slots 110, in the widened configuration, can have a width of about 0.001 inch to about 0.005 inch greater than the width of molding plates 114. The widened slots 110 permit molding plates 114 to be inserted into slots 110 with less resistance than would occur while inserting molding plates 114 into slots 110 of an undeformed molding tool 102. Thus, bending molding tool 102 can reduce the effort required to insert molding plates 114 into slots 110 and can reduce the likelihood of molding plates 114 being damaged when inserted into slots 110.

Figure 5D:
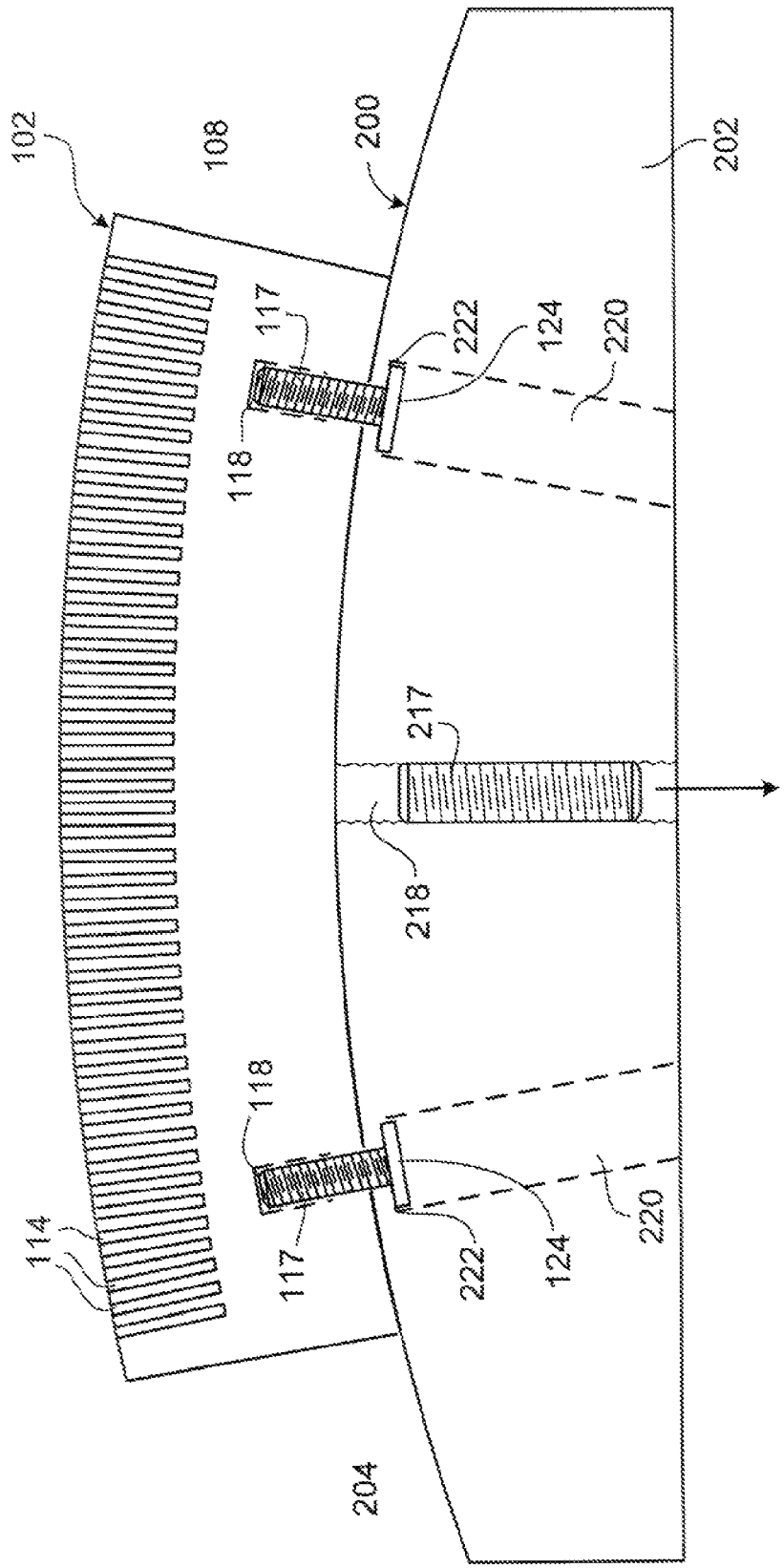

Referring to FIG. 5D, after disposing molding plates 114 within slots 110, base 108 of molding tool 102 is returned to its original, unbent configuration by moving limiting screw 217 radially inward through threaded bore 218 (e.g., by turning limiting screw 217 relative to threaded bore 218) such that the central portion of molding tool 102 moves radially inward. Alternatively or additionally to return base 108 of molding tool 102 to its original, unbent configuration, set screws 117 can be unscrewed from threaded recesses 118 such that the end regions of molding tool 102 move radially outward. When molding tool 102 is returned to its unbent configuration, slots 110 decrease in width, causing molding plates 214 to be held securely between projections 130 of molding tool 102. When base 108 of molding tool 102 is in die undeformed configuration, the width of each of slot 110 is no more than about 0.005 inch greater (e.g., about 0.001 inch to about 0.005 inch greater) than the width of each molding plate 114. The width of each slot 110 can, for example, be about 0.004 inch to about 0.020 inch (about 0.006 inch to about 0.012 inch). As a result, molding plates 114 are firmly retained within slots 110.

While the above-described method involves the use of set screws 117 to draw the end regions of molding tool 102 radially inward toward bending assembly 200, any of various other devices can be used. For example, a vise can be arranged on bending assembly 200 sod adapted to received end regions of molding tool 102 within the vise such that, as the vise is closed, the end regions of molding tool 102 are drawn radially inward toward bending assembly 200. Any of various other devices that are capable of drawing end regions of molding tool 102 toward bending assembly 200 to widen slots 110 can alternatively or additionally be used.

Similarly, while the above-described method involves the use of limiting screw 217 to substantially prevent the central region of molding tool 102 from being drawn inward along with the end regions of molding tool 102, other member can be used. For example, instead of using limiting screw 217, a projection can be welded or otherwise attached to a central portion of outer surface 204 of bending assembly 200. Because the projection would not be capable of being retracted into base 202 of bending assembly 200, after molding tool 102 was bent, molding tool 102 would be returned to its original unbent configuration by loosening set screws 117. Other mechanisms, such as hydraulic presses and/or pneumatic presses, can alternatively or additionally be used to substantially prevent the central region of molding tool 102 from being drawn inward along with the end regions of molding tool 102 daring the bending process.

After loading the desired number of molding tools 102 with molding plates 114, the molding tools 102 are removed from bending assembly 200 and secured to inner ring 114 of mold roll assembly 104, as shown in FIGS. 1 and 2. Molding tools 102, as shown in FIG. 3 are secured to inner ring 104 by passing set screws 117 through bores 120 of inner ring 114 and screwing set screws 117 into threaded recesses 118 of molding tool 102 to draw molding tool 102 radially inward against the outer surface of inner ring 114. Set screws 117 are tightened to an extent that will substantially prevent radial and circumferential movement of molding tool 102 relative to inner ring 114. After securing a sufficient number of molding tools 102 to inner ring 114 to provide a substantially continuous molding surface around the circumference of inner ring 114, inner ring 114 and molding tools 102 secured thereto are slid onto drum 106 to complete the construction of mold roll assembly 100.

As an alternative to using bending assembly 200 to insert molding plates 114 into slots 110 of molding tools 102 prior to securing molding tools 102 to inner ring 104, the inner ring can be equipped with limiting screws 217 arranged to contact central portions of molding fools 102 as end regions of molding tools 102 are drawn radially inward by set screws 117. Using tins type of inner ring would allow the user to insert molding plates 114 within slots 110 while base 108 of molding tool 102 is secured to the inner ring. After loading molding plates 114 into slots 110, limiting screws 218 could be retracted into the inner ring to allow molding tools 102 to return to their original, unbent configuration. By using the inner ring in this manner, the steps of loading molding plates 114 into slots 110 and seeming molding tools 102 to the inner ring could be consolidated, thereby increasing the efficiency of preparing and assembling the mold roll assembly.

Figure 6:
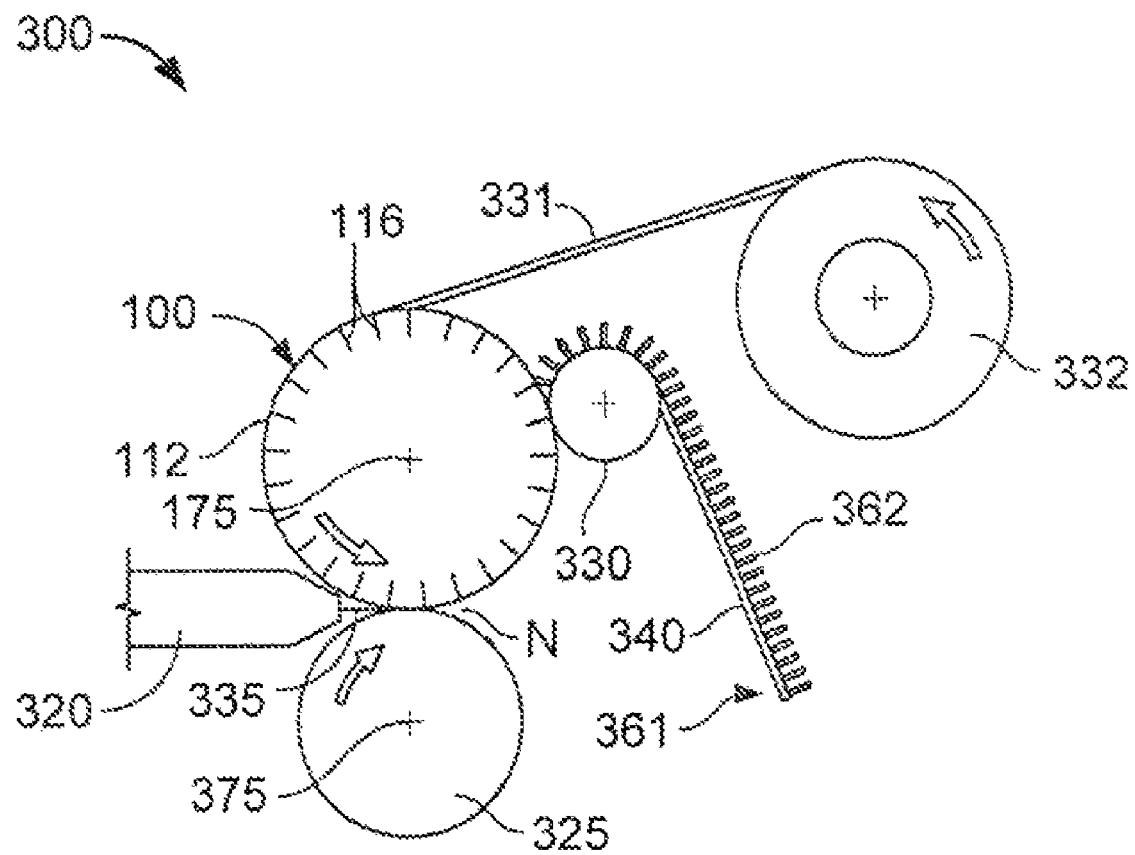
FIG. 6 illustrates a method and apparatus for making fastener products using the mold roll assembly of FIG. 1.

Referring to FIG. 6, a molding system 300 for making fastener products includes mold roll assembly 100, an extruder 320, a pressure roll 325, and a stripping roll 330. During use, a sheet-form material 331 is held in tension between a sheet-from material roll 332, mold roll assembly 100, and stripping roll 330. Sheet-form material 331 may include one or more of various materials. For example, sheet-form material 331 may be a loop material, a non-woven fabric, a reinforcing scrim, a porous material, paper, or foam.

Mold roll assembly 100 is positioned adjacent pressure roll 325 such that, axes of rotation 175 and 375 of mold roll assembly 100 and pressure roll 325, respectively, are substantially parallel to one another. A nip N is created between circumferential surface 112 of mold roll assembly 100 and an adjacent surface of pressure roll 325. Mold roll assembly 100 and pressure roll 325 rotate counter to one another, which creates a large amount of pressure within nip N.

Extruder 320 extrudes s molten resin 335 into nip N where it meets sheet-form material 331. Molten resin 335 may include one or more of various different thermoplastics and other resins. For example, a high density polyethylene, such as Exxon Mobil #6908, can be used for some applications. Other suitable materials include low density polyethylene (LDPE), polypropylene, and nylon.

As sheet-form material 331 and molten resin 335 are conveyed through nip N, the high nip pressure forces some of the molten resin 335 into molding cavities 116 to mold an array of hook-shaped fastener elements 362, while the remainder of molten resin 335 is compressed between peripheral surface 112 of mold roll assembly 100 and an adjacent surface of pressure roll 325 to form a resin base 340 from which fastener elements 362 extend. The high nip pressure can also bond resin base 340 to sheet-form material 331. Alternatively or additionally other suitable attachment methods may be used to attach resin base 340 to sheet-form material 331. For example, a heat-sensitive adhesive may be applied to one side of sheet-form material 331 and heat may be applied, at a later time, to resin base 340 and/or sheet-form material 331 in order to adhesively bond resin base 340 to sheet-form material 331.

After molten resin 335 has been forced into molding cavities 116, the resin is allowed to cool and harden within molding cavities 116. In some embodiments, mold roll assembly 100 and pressure roll 325 are internally cooled by liquid (e.g., water) to facilitate the cooling of molten resin 335. After cooling and hardening, resin 335 has a shape permanently corresponding to the shape of molding cavities 116 (i.e., a hook shape).

Sheet-form material 331 and the resin carried thereon are then conveyed along mold roil assembly 100 toward stripping roll 330. Sheet-form, material 331 and the resin thereon are conveyed around stripping roll 330, causing some of fastener elements 362, which have been allowed to cool and harden, to be stripped from molding cavities 116. At this point, a fastener product sheet 361 having an array of fastener elements 362 extending from resin base 340 is exposed. Fastener product sheet 361 is then separated (e.g., cut, slit, and/or punched) to form multiple discrete fastener products 400.

Figure 7:
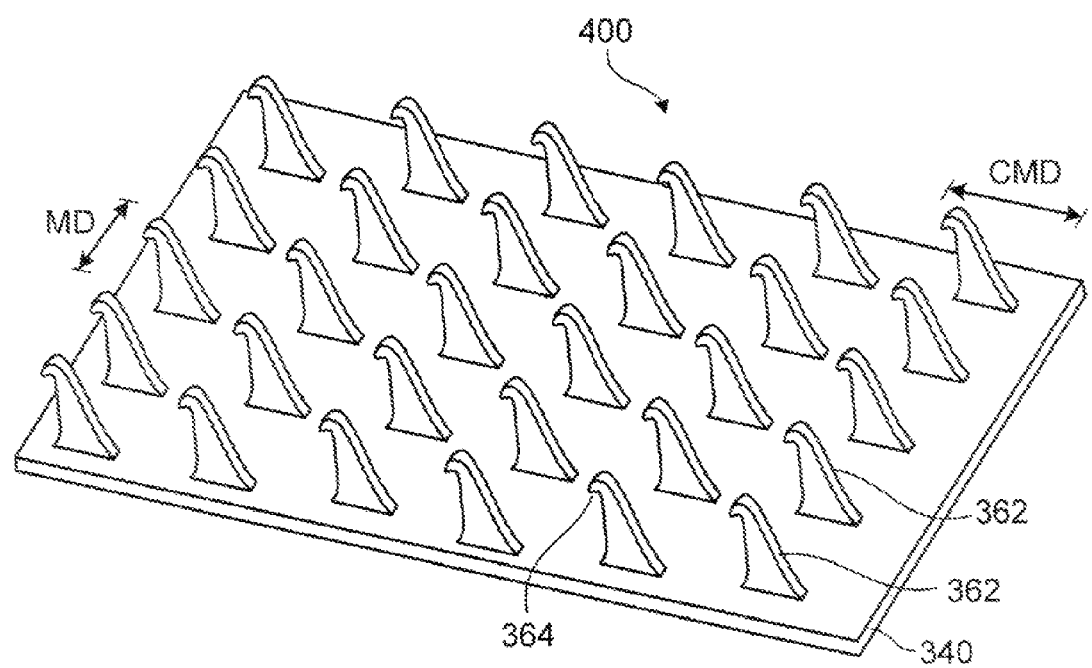
FIG. 7 is a perspective view of a fastener product made using the method and apparatus illustrated in FIG. 6.

FIG. 7 illustrates a fastener product 400 manufactured using the above-described molding technique. As shown in FIG. 7, fastener product 400 includes multiple rows of fastener elements 362 integrally extending from resin base 340. Fastener elements 362 include crook portions 364 extending (e.g., from rear to front) in a cross-machine direction (CMD) (i.e., transverse to base 340 and perpendicular to machine direction (MD)). Crook portions 364 of fastener elements 362 are designed to engage with corresponding fastener elements (e.g., loop material, nonwoven materials, etc.) in order to provide peel and shear resistance. Each of fastener elements 362 are aligned in the same direction. As a result, fastener product 400 provides very little peel and shear resistance in one direction and a great deal of peel and shear resistance in the opposite direction.

While each of fastener elements 362 of fastener product 400 has been described as being aligned in the same direction, other arrangements are possible. In some embodiments, for example, some of fastener elements 362 face the left side of fastener product 400 and the remaining fastener elements 362 face the right side of fastener product 400. Every other row of fastener elements 362 can, for example, be arranged in opposite directions. This can be achieved by reversing the direction of every other molding plate 114 along the circumference of mold roll assembly 100. As another example, every other fastener element 362 within each row of fastener elements can face in an opposite direction. This can be achieved by modifying molding plates 114 so that every other molding cavity 116 along molding plate 114 includes a crook portion 128 that faces in an opposite direction than crook portions 128 of adjacent molding cavities 116. Fastener products that include fastener elements with crook portions facing in opposite directions can provide relatively high levels of peel and shear resistance in both transverse directions of the fastener product (i.e., from left to right across the fastener product and from right to left across the fastener product).

Figure 8:
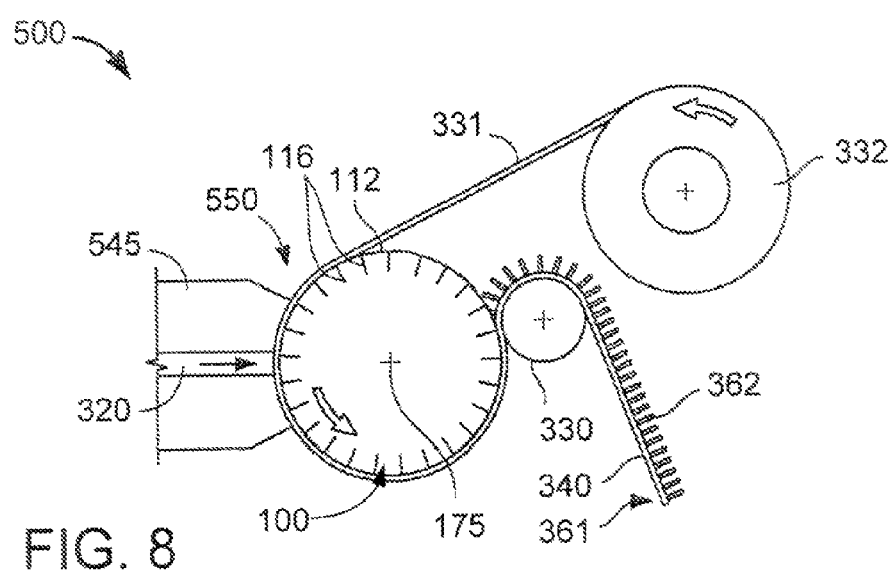
FIG. 8 illustrates another method and apparatus for making fastener products using the mold roll assembly of FIG. 1.

Referring to FIG. 8, an alternative apparatus 500 for producing fastener products includes mold roll assembly 100, extruder 320, an extruder housing 545, and stripping roll 330. Extruder housing 545 is disposed around extruder 320. Extruder housing 545 is arcuate-shaped to define a predetermined gap 550 between extruder housing 545 and peripheral surface 112 of mold roll assembly 100. Molten resin is extruded through extruder 320 and into gap 550. At the same time, sheet-form material 331 is conveyed from sheet-form material roll 332 into gap 550.

In this embodiment, sheet-form material 331 is a porous material. As sheet-form material 331 is conveyed around mold roll assembly 100, extruder 320 forces molten, resin both onto and through sheet-form material 331. Due to the porosity of sheet-form material 331, some of the resin passes through sheet-form material 331 and into molding cavities 116 to form fastener elements 362, while the remainder of the resin adheres to sheet-form material 331 to form resin base 340 from which fastener elements 362 extend. The molten resin is allowed to cool and harden before being stripped out of molding cavities 116 by stripping roll 330 to expose a newly formed fastener product sheet 361 having fastener elements 362 extending from resin base 340. The fastener product sheet 361 can then be cut to form discrete fastener products similar to fastener product 400 shown in FIG. 7.

While the methods described above include passing sheet-form material 331 into nip N or gap 550, in some embodiments, resin alone is passed into the nip or gap of the molding apparatus to form the resulting fastener products.

While certain embodiments have been described above, other embodiments are possible.

Figure 9:
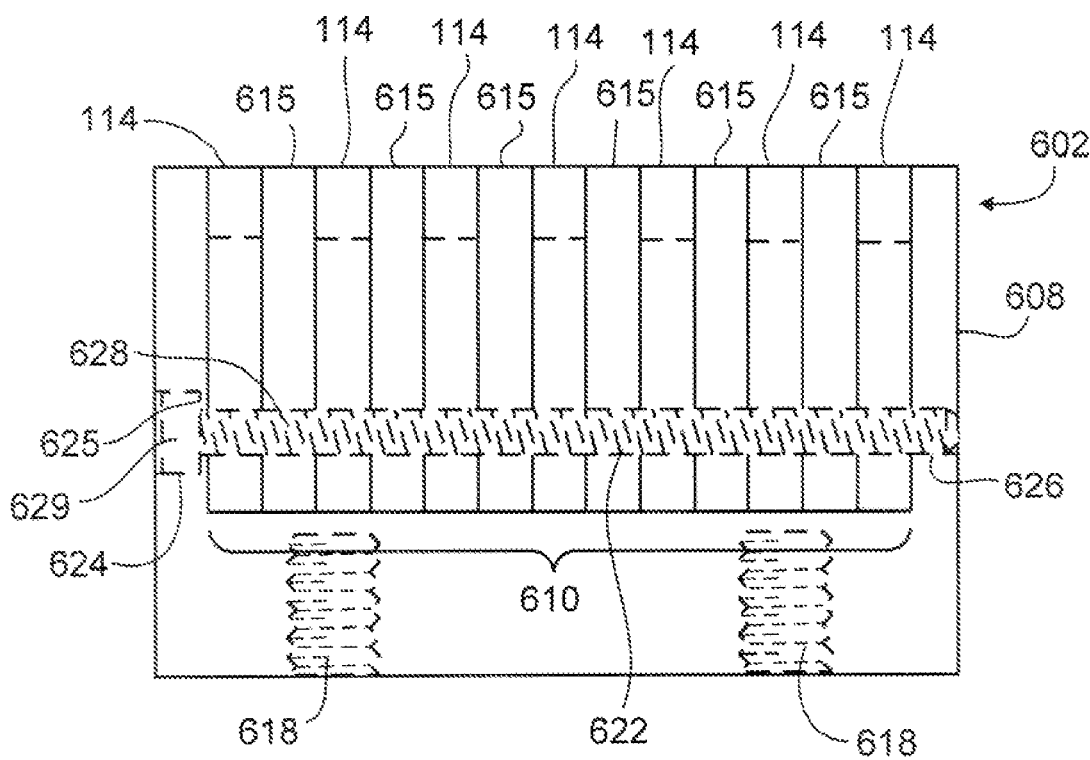
FIG. 9 is a side view of another type of molding tool that can be used in the mold roll assembly of FIG. 1.

While molding tool 102 has been described as including a base 108 with relatively narrow slots 110 in which molding plates 114 are disposed, other types of molding tools can alternatively or additionally he used. As shown in FIG. 9, for example, a molding tool 602 includes a base 608 that defines a relatively wide, transverse slot 610. A series of alternating molding plates 114 and spacer plates 615 are disposed within slot 610. Each of plates 114 and 615 includes an aperture in a lower portion of the plate such that plates 114 and 615, when stacked together within slot 610, form a bore 622. Bore 622 aligns with a through bore 624 formed in one end portion of base 608 and a threaded recesses 626 formed in an opposite end portion of base 608. A screw 628 extends through bore 624 of the one end portion of base 608 and through bore 622 of plates 114, 615. Screw 628 matingly engages threaded recesses 626 in the opposite end portion of base 608. Through bore 624 of base 608 includes a lip 625 that engages a head 629 of screw 628 when screw 628 is fully inserted through bore 622 and screwed into threaded recess 626. Thus, as screw 628 is screwed into threaded recess 626, the opposite sides of base 608 are drawn toward one another. This helps to tightly compress plates 114, 615 between the opposite sides of base 608, which can help to securely retain plates 114, 615 within slot 610 of base 608 and can help to prevent flashing between adjacent plates during the fastener product manufacturing process. Base 608 of molding fool 602 also includes threaded recesses 618 that allow molding tool 602 to be secured to inner ring 104 with set screws 117, in a manner similar to that discussed above with respect to molding tools 102. Multiple molding tools 602 can be arranged about the circumference of inner ring 104 to form a substantially continuous molding surface along the circumference of the resulting mold roll assembly.

While plates 114 and 615 of molding tool 602 have been described as being retained within slot 610 of base 608 using screw 628, plates 114 and 615 can alternatively or additionally be retained within slot 610 of base 608 using other techniques. For example, base 608 can be loaded onto bending assembly 200 (FIGS. 5A-5D) and deformed to widen slot 610. Plates 114, 615 can then be disposed within the widened slot. After disposing plates 114, 615 within slot 610, base 608 can be returned to its original, undeformed configuration such that plates 114, 615 become tightly squeezed or compressed between the opposite sides of base 608.

Figure 10:
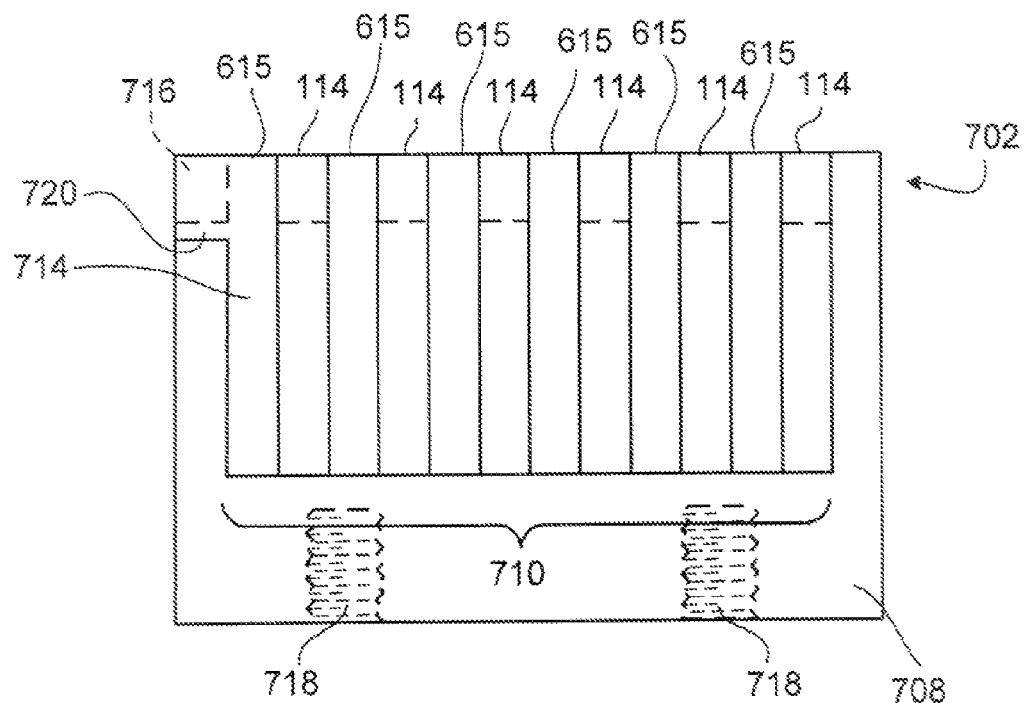
FIG. 10 is a side view of another type of molding tool that can be used in the mold roll assembly of FIG. 1.
Figure 11:
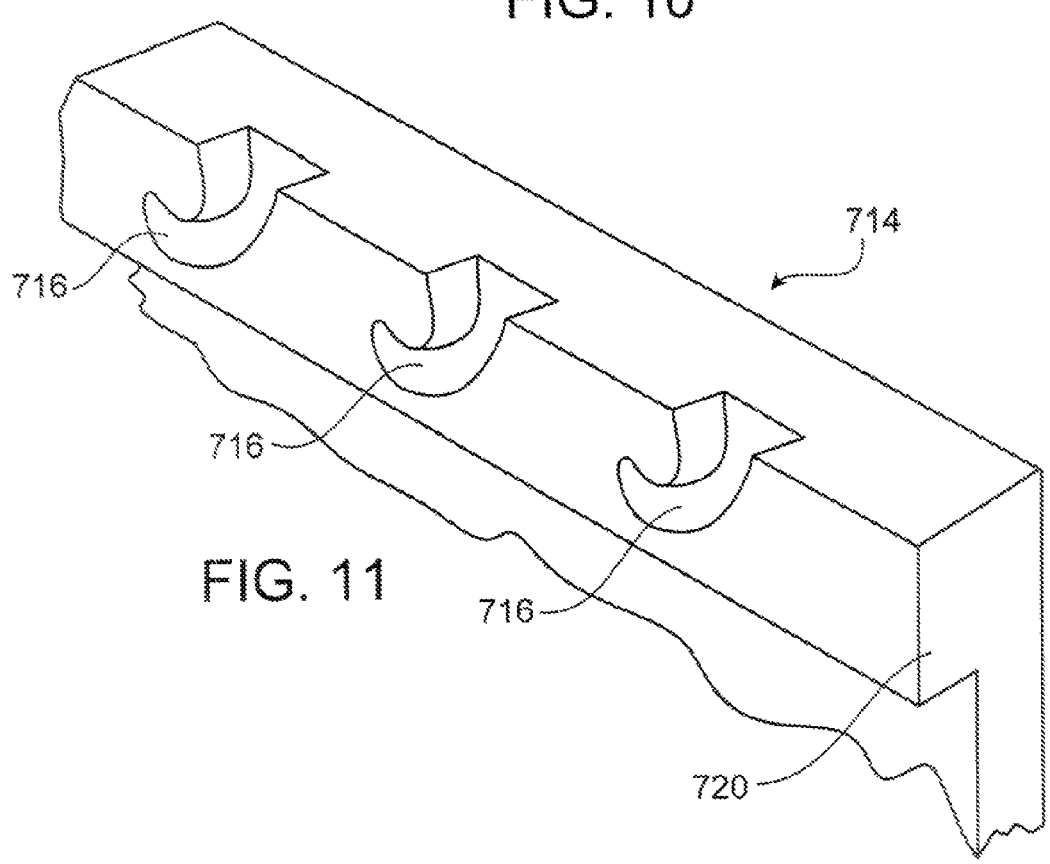
FIG. 11 is a perspective view of an t-shaped molding plate of the molding tool of FIG. 10.

As shown in FIG. 10, a molding tool 702 includes a series of alternating molding plates 114 and spacer plates 615 disposed within a slot 710 of a base 708. A wall at one end of base 708 (i.e., at the right end of base 708, as shown) extends higher than a wall at the other end of base 708 (i.e., at the left end of base 708, as shown). An L-shaped molding plate 714 is disposed at one end of the stack of plates 114, 615, adjacent the relatively short left end wall of base 708 (i.e., between the stack of plates 114, 615 and the relatively short, left end wall of base 708). L-shaped molding plate 714 includes an overhanging portion 720, which overlies the relatively short, left end wall of base 708. As shown in FIG. 11, hook-shaped molding cavities 716 are partially formed within overhanging portion 720 of L-shaped molding plate 714. Referring again to FIG. 10, base 708 includes threaded recesses 718 that permit molding tool 702 to be secured to inner ring 104 using a technique similar to those discussed above with regard to molding tools 102 and 602. As discussed above with regard to molding tools 102 and 602, multiple molding tools 702 can be secured around inner ring 104 to form a substantially continuous molding surface about the circumference of the resulting mold roll assembly. When, multiple molding tools 702 are disposed around inner ring 104, overhanging portion 720 of L-shaped molding plate 714 of one molding tool 702 abuts the relatively tall, right end wall of base 708 of an adjacent molding tool 702. Consequently, overhanging portion 720 cooperates with the relatively tall, right end wall of base 708 of the adjacent molding tool 702 to fully define hook-shaped molding cavity 716. This arrangement helps to prevent the existence of hook-free regions in those portions of fastener products formed by the portion of a mold roll assembly where adjacent molding tools abut one another. L-shaped molding plate 714, for example, helps to ensure a uniform book spacing along the length of the resulting fastener product.

While base 708 of molding tool 702 has been described as having one end that is taller than an opposite end to effectively form a recessed portion that receives overhanging portion 720 of L-shaped molding plate 714, the opposite end walls of the base can alternatively extend to substantially equal heights. In such embodiments, L-shaped molding plate 714 can be disposed at one end of slot 710, as discussed above, and an L-shaped spacer plate can be positioned at an opposite end of slot 710 such that an overhanging portion of the L-shaped spacer plate overlies the end of base 708. The L -shaped spacer plate can be similar to L-shaped molding plate 714 but without a molding cavity partially defined in its overhanging portion. As a result, when multiple molding tools are disposed around the circumference of inner ring 104, overhanging portion 720 of L-shaped molding plate 714 of one molding tool abuts the overhanging portion of fee L-shaped spacer plate of an adjacent molding tool to completely define hook-shaped molding cavity 716.

Figure 12:
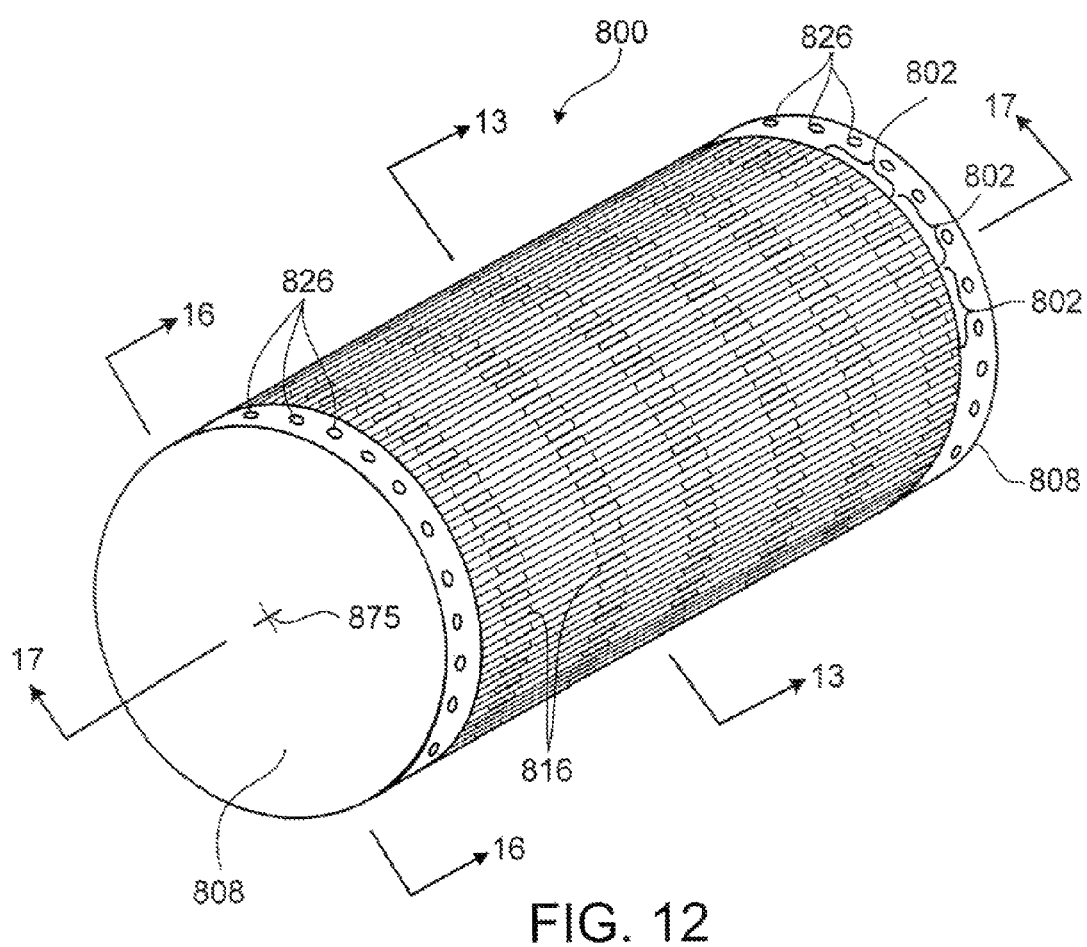
FIG. 12 is a perspective view of an alternative mold roll assembly
Figure 13:
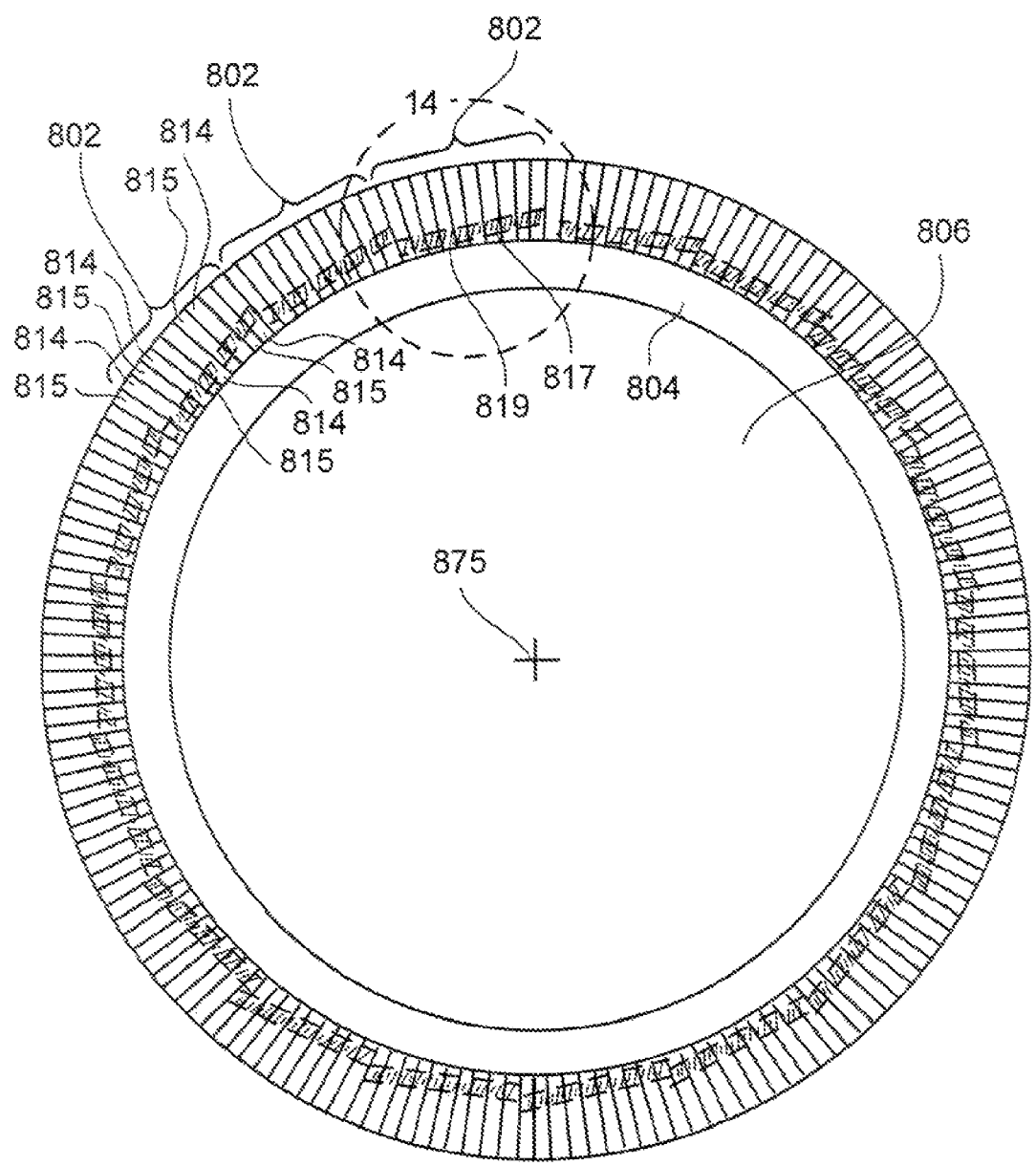
FIG. 13 is a cross-sectional view of the mold roll assembly of FIG. 12, taken along line 13-13 in FIG. 12.

While the molding tools of the embodiments discussed above include abase defining one or more slots and plates (e.g., molding plates or an alternating series of molding plates and spacer plates) disposed in the one or more slots, other types of molding tools can be used. Referring to FIGS. 12 and 13, for example, a mold roll assembly 800 includes multiple molding tools 802 disposed around an inner ring 804, which is disposed around a drum 806. End caps 808 are disposed at opposite ends of mold roll assembly 800 and help to axially and radially restrain molding tools 802.

Figure 14:
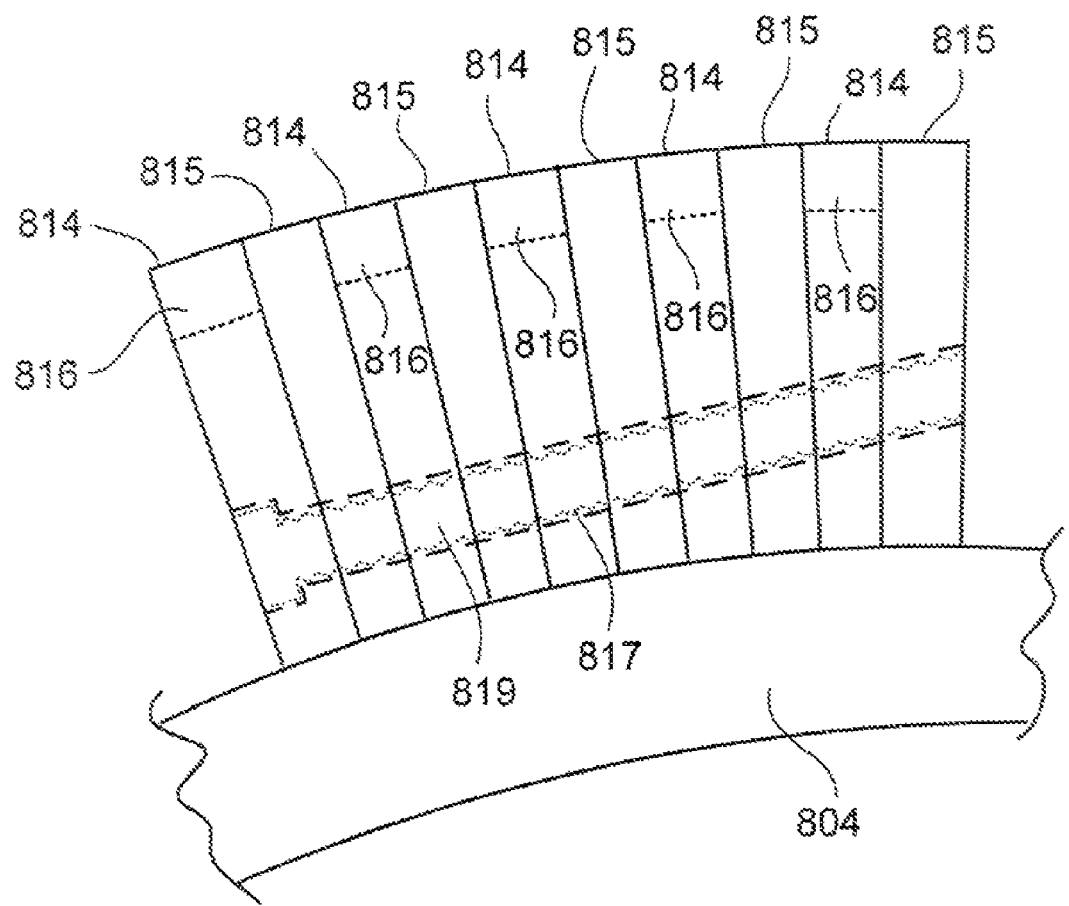
FIG. 14 is a side view of a molding tool of the mold roll assembly of FIG. 12 disposed about an inner ring of the mold roll assembly.

As shown in FIGS. 13 and 14, each molding tool 802 includes a stack of molding plates 814 and spacer plates 815 arranged in alternating order. Each of molding plates 814 and spacer plates 815 defines a threaded aperture such that, when the plates are stacked together, they define a threaded bore 817 that extends along the length of the plate grouping. Each of molding plates 814 and spacer plates 815 of a particular plate grouping are screwed onto screw 819 to hold the plates in a stacked arrangement. In some embodiments, screw 819 extends slightly beyond an end of the plate grouping that it holds together and engages a threaded aperture formed in an adjacent plate grouping (e.g., formed in one or more end plates of the adjacent plate grouping). In such embodiments, screw 819, in addition to helping to secure the individual plates of its plate grouping, also helps to secure the adjacent plate groupings to one another. Molding plates 814 and spacer plates 815 cooperate to form multiple hook-shaped molding cavities 816.

While molding plates 814 and spacer plates 815 have been described as being screwed onto screw 819, the plates can alternatively or additionally be retained in the stacked configuration by welding adjacent plates together, by soldering adjacent plates together, by adhering adjacent plates to one another with adhesive, by using magnets to hold adjacent plates together, and/or by engaging mating portions of adjacent plates together (e.g., using a tongue and groove arrangement or another type of mechanical mating arrangement).

Figure 15A:
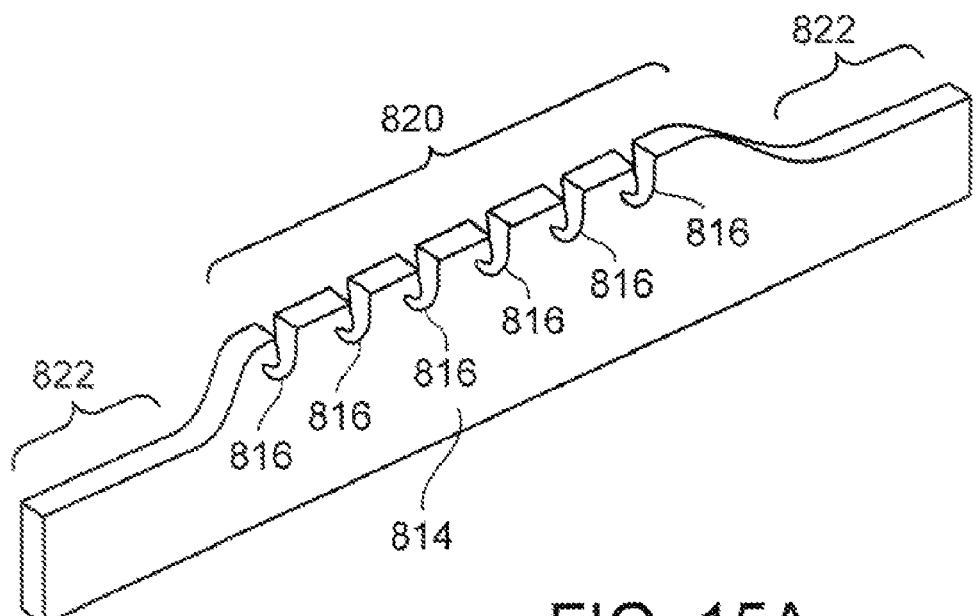
FIGS. 15A and 15B are perspective views of a molding plate and a spacer plate, respectively, of the mold roll assembly of FIG. 12.
Figure 15B:
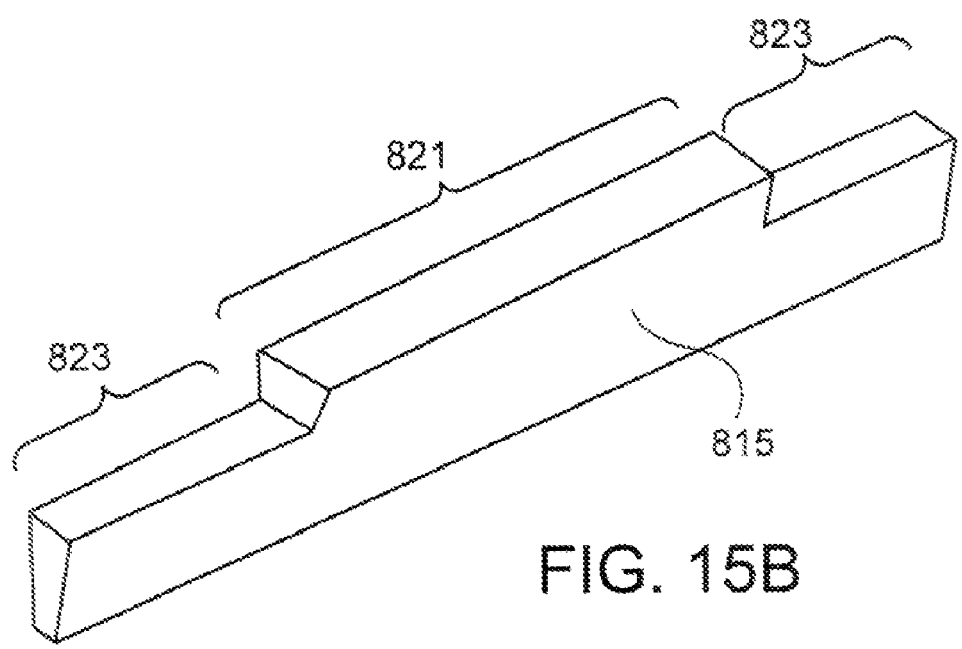

Referring to FIGS. 15A and 15B, molding plates 814 have a central portion 820 that has a greater height than end portions 822, and spacer plates 815 have a central portion 821 that has a greater height than end portions 823. Hook-shaped molding cavities 816 are partially defined by central portions 820 of molding plates 814. When a group of molding plates 814 and spacer plates 815 are stacked together, as shown in FIG. 14, central portion 821 of spacer plates 815 abut central portions 820 of molding plates 814 to fully define hook-shaped molding cavities 816. Molding plates 814 have a substantially constant cross section while spacer plates 815 taper gradually inward from their top surface toward their bottom surface. Due to the taper of spacer plates 815, the plate groupings are arced along their bottom surfaces such that the bottom surfaces of the plate groupings mate with the arced outer surface of inner ring 804. This arrangement helps to ensure that the circumferential surface of the mold roll assembly is smooth.

Figure 16:
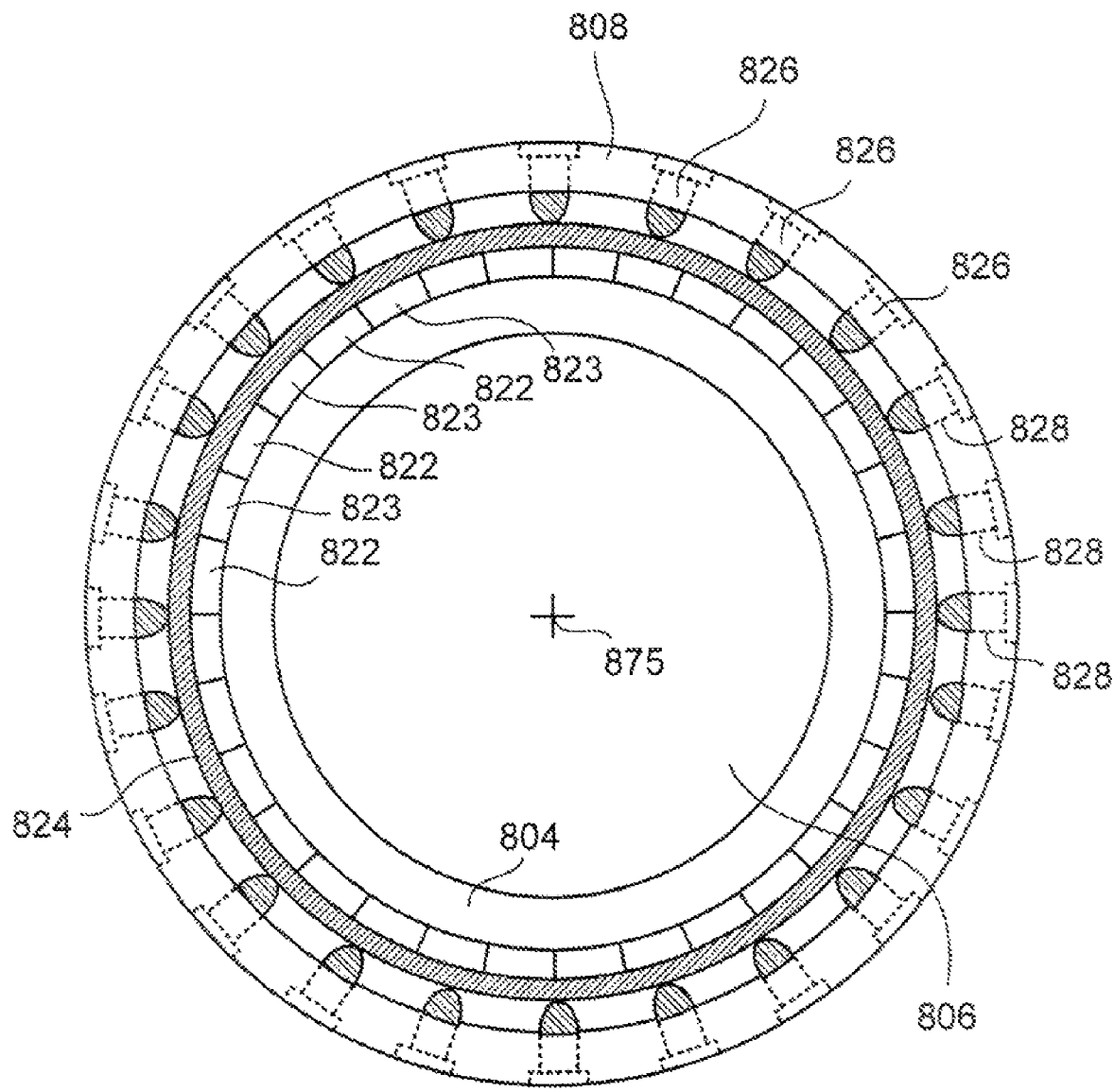
FIG. 16 is a cross-sectional view of the mold roll assembly of FIG. 12, taken along line 16-16 in FIG. 12.
Figure 17:
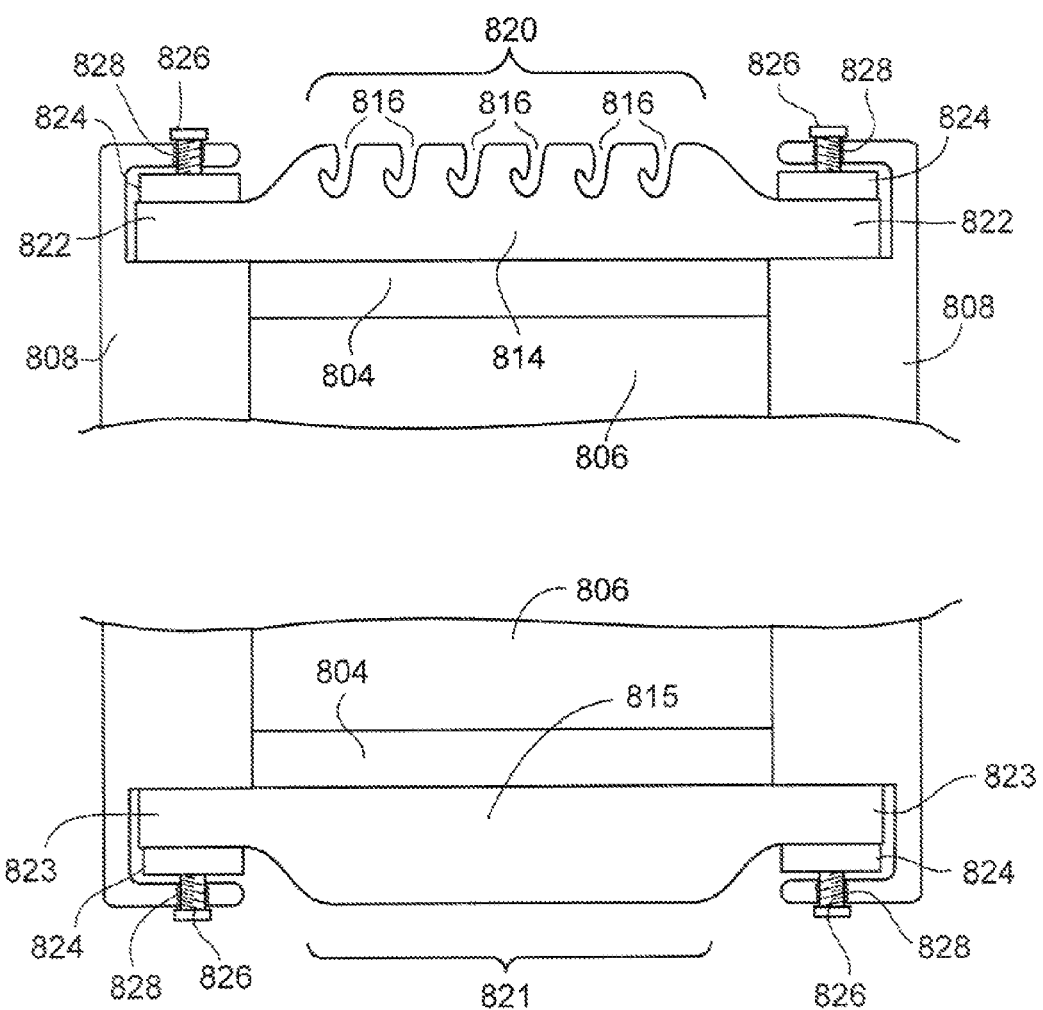
FIG. 17 is a cross-sectional view of the mold roll assembly of FIG. 12, taken along line 17-17 in FIG. 12.

Referring to FIGS. 16 and 17, each end cap 808 surrounds end portions 822 and 823 of molding plates 814 and spacer plates 815, respectively. End cap 808 can, for example, include a threaded portion that mates with a threaded portion of inner ring 804 to hold end cap 808 in place. A ring 824 is disposed between the inner surface of end cap 808 and the outer surface of end portions 822 and 823 of molding plates 814 and spacer plates 815. Ring 824 can be formed of one or more polymeric materials (e.g., acetal homopolymer, polytetrafluoroethylene, etc.) and/or one or more metals or alloys (e.g., stainless steel, aluminum, etc.).

End caps 808, as shown in FIGS. 16 and 17, include multiple, circumferentially spaced apart screws 826 that are disposed within threaded bores 828 extending radially through end caps 808. The radial position of screws 826 relative to ring 824 and end portions 822 and 823 of molding plates 814 and spacer plates 815, respectively, can be altered by turning screws 826 within threaded, bores 828. Screws 826 can for example, be screwed radially inward to apply an inward force via ring 824 to the end portions of one or more molding plates 814 and/or spacer plates 815. This can help to ensure that each end portion 822, 823 is pressed firmly against inner ring 804. Similarly, screws 826 can be screwed radially outward to reduce or remove a radially inward force on the end portions of one or more molding plates 814 and/or spacer plates 815. Screws 826 can, therefore, be used to adjust the radial position of one or more plates along various different circumferential portions of mold roll assembly 800. Ring 824 can help to distribute the force of screws 826 across a group of end portions 822 and 823 of molding plates 814 and spacer plates 815 to help ensure that the top surfaces of the adjusted plates lie flush with the peripheral surface of mold roll assembly 800 as a whole. Aligning the top surfaces of central portions 820 and 821 of molding plates 814 and spacer plates 815, respectively, can help to ensure that fastener products manufactured with mold roll assembly 800 have substantially constant thickness along their widths and lengths.

While mold roll assembly 800 has been described as including molding plates 814 of substantially constant cross section and spacer plates 815 that taper inwardly toward their bottom surface, the mold roll assembly can alternatively include molding plates that are tapered and spacer plates that have a substantially constant cross section. Alternatively, the mold roll assembly can include molding plates and spacer plates that are tapered.

While molding tools 802 have been described as being disposed around inner ring 804, which is disposed around drum 806, in some embodiments, molding tools 802 are disposed directly over drum 806.

Figure 18:
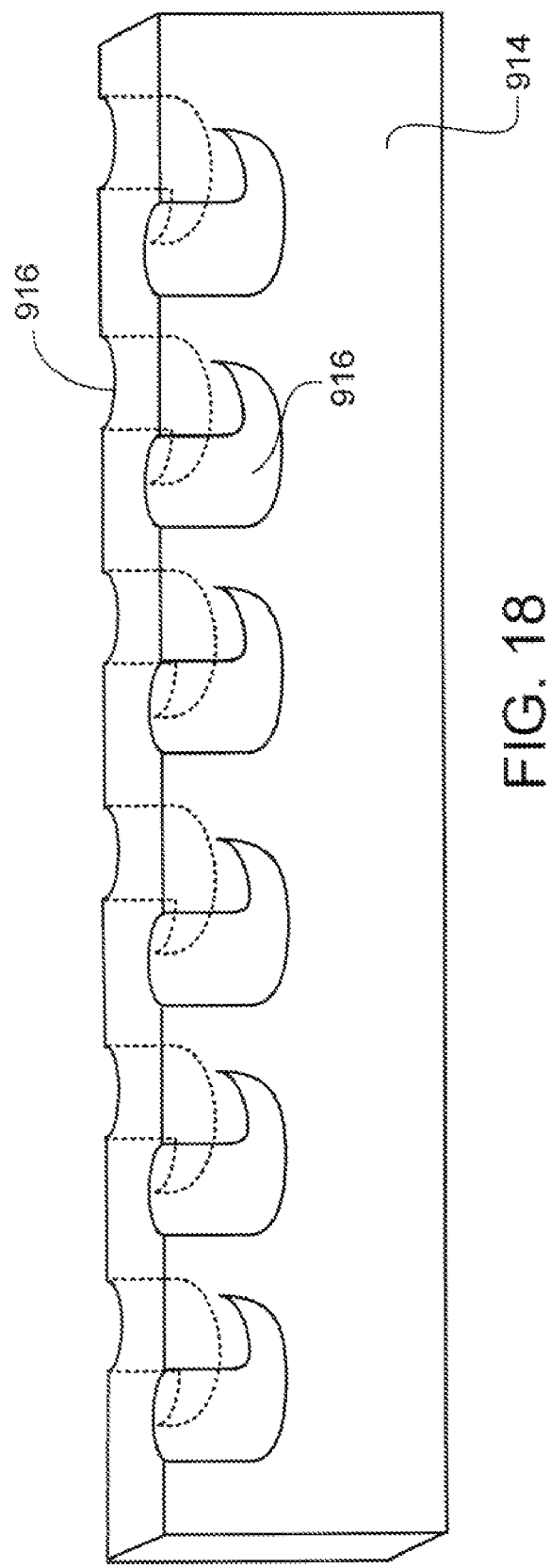
FIG. 18 is a perspective view of a molding plate including multiple hook-shaped cavities partially formed in side surfaces of the molding plate.

While the molding plates of certain embodiments described above include molding cavities that extend from one side of the molding plate to an opposite side of the molding plate, various other types of molding plates can be used. As shown in FIG. 18, for example, a molding plate 914 includes molding cavities 916 partially formed on each, side molding plate 914. Of course, molding plate 914 can alternatively include molding cavities 916 on only one side of molding plate 914.

Figure 19:
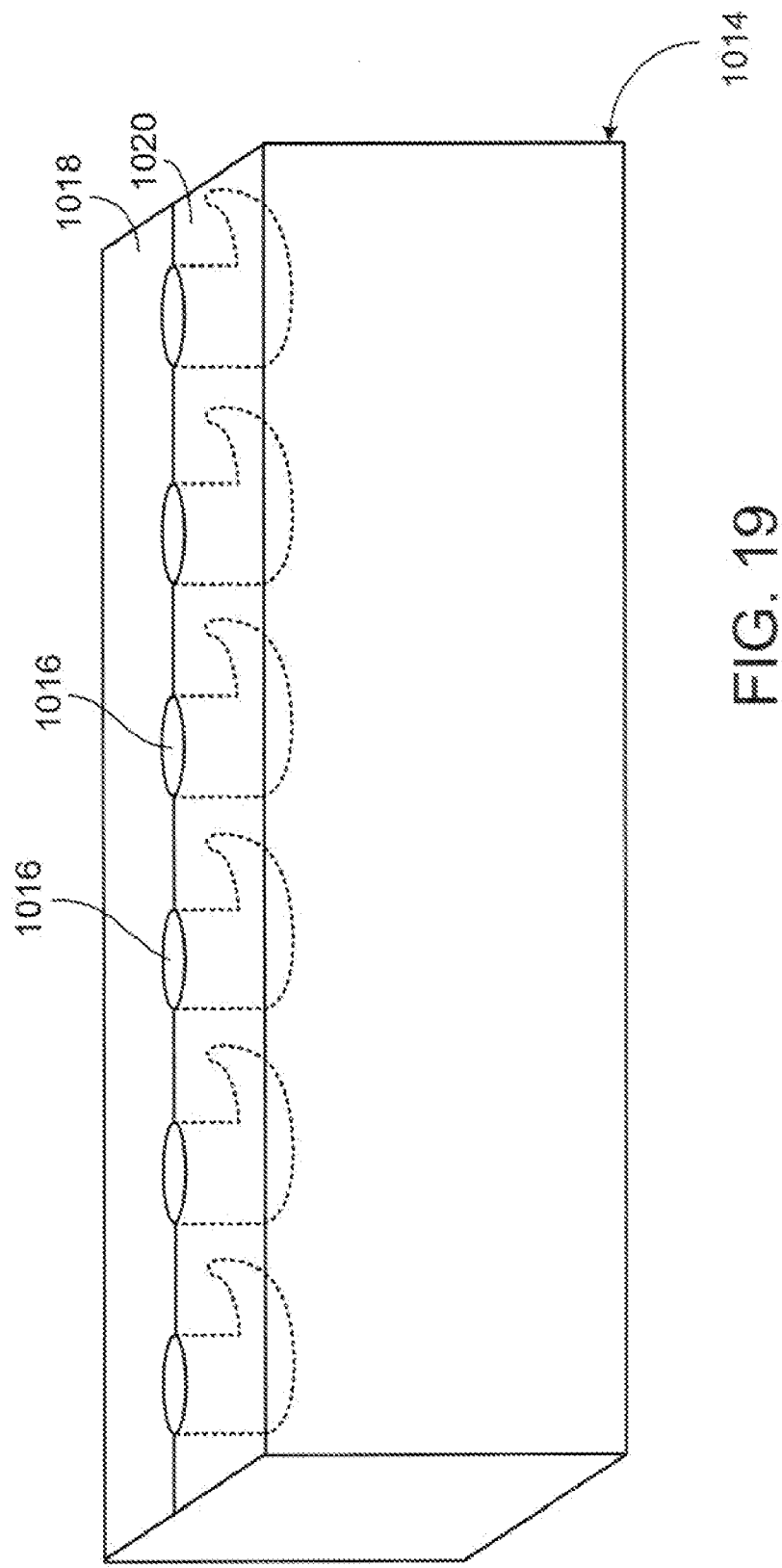
FIG. 19 is a perspective view of a molding plate including multiple hook-shaped cavities completely formed between two halves of the molding plate.

In certain embodiments, as shown in FIG. 19, a molding plate 1014 includes molding cavities 1016 that are completely formed between two halves 1018 and 1020 of molding plate 1014. To form molding plate 1014, material is removal from an inner surface of one or both of halves 1018, 1020, and halves 1018, 1020 are placed adjacent one another to provide completely defined molding cavities 1016 therebetween.

While both the molding plates and the slots of the molding tools described above have been shown as having substantially rectangular cross sections, the molding plates can alternatively include enlarged lower portions that fit within enlarged lower portions of the slots to help to radially retain molding plates.

While certain methods described above involve using screws extending from a molding tool bending assembly to pull the ends of a molding tool radially inward in order to widen slots of the molding tool, the molding tool can alternatively or additionally be arranged to push the ends of the molding tool radially inward to widen the slots. For example, vises can be arranged at opposite ends of the molding tool bending assembly to apply a radially inward force to the outer surface of the molding tool, at opposite ends of the molding tool, in order to push the ends of tire molding tool radially inward and widen the slots of the molding tool.

Figure 20:
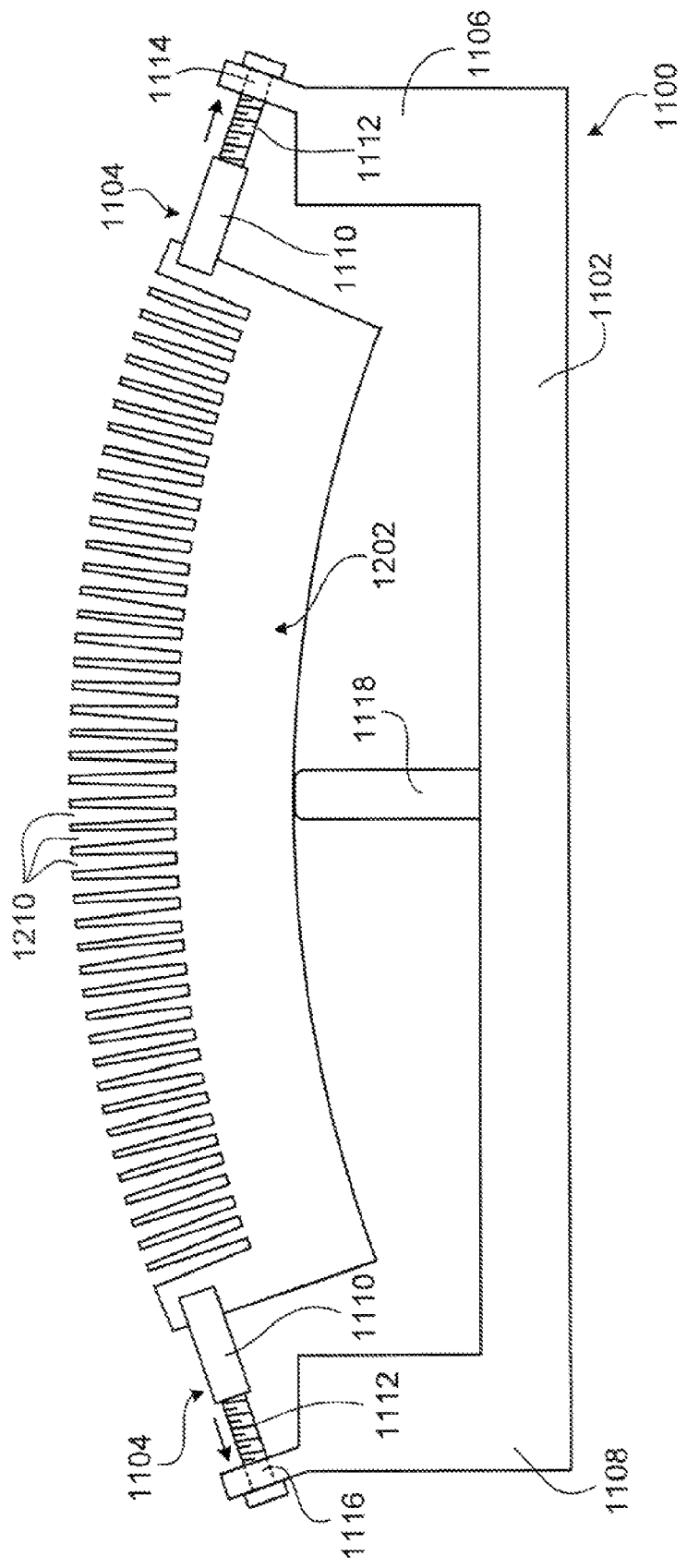
FIG. 20 is a side view of a molding tool disposed on a molding tool beading assembly.

As another example, ends of the molding tool, can be pulled laterally outward in order to widen the slots. Referring to FIG. 20, for example, a molding tool bending assembly 1100 includes a base 1102 and clamp mechanisms 1104 extending inward from opposite cods 1106, 1108 of base 1102. Each of clamp mechanisms 1104 includes jaws 1110 that are capable of firmly grasping the end portion of a molding tool and a screw 1112 engaged, to jaws 1110. Screws 1112 of clamp mechanisms 1104 are disposed within threaded bores 1114, 1116 of ends 1106, 1108 of base 1102. Molding tool bending assembly 1100 also includes a projection 1118 that extends radially outward from a central portion of base 1102. To widen slots 1210 of a molding tool 1202, molding tool 1202 is positioned on molding tool bending assembly 1200, with a bottom surface of molding tool 1202 resting on projection 1118. End portions of molding tool 1202 are then grasped tightly by jaws 1110 of clamp mechanisms 1104. Subsequently, screws 1112 are rotated within threaded bores 1114 and 1116 to pull the ends of molding tool 1202 laterally outward in opposite direction and widen slots 1210 of molding tool 1202. Molding plates can then be disposed within slots 1210 and the ends of molding tool 1202 can be returned to their original positions to retain fee molding plates within slots 1210.

While the mold roil assemblies of certain embodiments describe above include only a single inner ring and a series of molding tools disposed around the inner ring, a mold roll assembly can alternatively include multiple inner rings, with each inner ring including a series of molding tools disposed around the inner ring. The combination of inner rings and molding tools can be disposed side by side across a drum to form a wider molding assembly. As a result, the resulting molding assembly can be used to mold wider fastener products. When inner rings and molding tools of the kind shown in FIGS. 1-3 are disposed around a drum in the manner described above, the resulting fastener product can include substantially no hook-free regions across its width (e.g., no hook-free regions having a greater width, than those regions between molding cavities defined within a single molding plate) because the inner ring and molding tools shown in FIGS. 1-3 are secured together without the use of end caps or end rings.

While the mold roll assemblies of certain embodiments above are shown as including six molding cavities across its width, other arrangements are possible. In certain embodiments, for example, a mold roll assembly includes greater than six molding cavities (e.g., greater than seven molding cavities, greater than ten molding cavities, greater than 15 molding cavities, greater than 20 molding cavities, etc.) across its width. The molding plates of the mold roll assembly can, for example, be longer than those of the embodiments described above to permit a greater number of molding cavities to be formed. Alternatively or additionally, the molding cavities can be smaller. Similarly, a mold roll assembly can include fewer than six molding cavities (e.g., fewer than live molding cavities, fewer than tour molding cavities, fewer than three molding cavities, fewer than two molding cavities) across its width.

While the mold roll assemblies of certain embodiments described above were described as including book-shaped molding cavities extending along a cross-machine direction (i.e., in a direction transverse to the mold roll assembly), the mold roll assemblies can alternatively or additionally be configured to include hook-shaped molding cavities that extend along a machine direction. For example, end surfaces of the molding plates can partially define molding cavities that extend perpendicular to the molding cavities formed along the length of the molding plates, and multiple molding plates can be disposed within the slots of the molding tools such that abutting end surfaces of adjacent plates cooperate to form hook-shaped molding cavities that extend in the machine direction. As another example, as an alternative to or in addition to providing molding tools that include slots extending transversely across the molding tools, molding tools including slots that extend circumferentially about the molding tools can be provided. Molding plates similar to those shown in FIGS. 4, 18, and 19 can be disposed within the circumferentially extending slots to form hook-shaped molding cavities extending in the machine direction, in certain cases, the molding plates can include an arced inner surface, similar to base 108 of molding tool 102, to conform to the curvature of the slots in which they are disposed. As a further example, multiple arc-shaped molding plates can be stacked together across the width of the mold roll assembly to form machine direction hook-shaped cavities.

As described above, the molding cavities of the various different molding plates described herein can be shaped to mold hook-shaped fastener elements. However, the molding cavities can alternatively or additionally be shaped to form other types of fastener elements. For example, the molding cavities can be shaped to form palm tree-shaped elements, mushroom-shaped elements, and/or stems.

Other embodiments are in the claims.

What is claimed is:

1. A mold roll assembly, comprising:
   an inner member; and
   a plurality of molding tools disposed about a circumference of the inner member, each molding tool comprising
      a base defining a slot that extends transversely across the mold roll assembly, and
      at least one molding plate disposed within the slot defined by the base of the molding tool, the at least one molding plate at least partially defining a molding cavity that is configured to form a fastener element when molten resin is forced into the molding cavity and then allowed to cool and harden.

2. The mold roll assembly of claim 1, wherein the base of each molding tool defines a plurality of slots, and a molding plate is disposed within each of the slots.

3. The mold roll assembly of claim 2, wherein the inner member comprises a projection adapted to extend radially outward from the inner member, the projection being arranged to contact a central portion of an inner surface of the base of one of the molding tools.

4. The mold roll assembly of claim 3, wherein the projection is radially displaceable within a bore defined by the inner member.

5. The mold roll assembly of claim 1, wherein at least some of the molding tools comprise a plurality of molding plates and spacer plates, the spacer plates being disposed between adjacent molding plates.

6. The mold roll assembly of claim 5, wherein at least some of the spacer plates are tapered.

7. The mold roll assembly of claim 1, wherein each of the molding tools is secured to the inner member.

8. The mold roll assembly of claim 7, wherein each of the molding tools is secured to the inner member with at least one mechanical fastener.

9. The mold roll assembly of claim 8, wherein the at least one mechanical fastener comprises at least one screw.

10. The mold roll assembly of claim 1, wherein circumferentially adjacent molding tools are secured to one another.

11. The mold roll assembly of claim 1, further comprising a drum around which the inner member is disposed.

12. The mold roll assembly of claim 1, wherein the inner member comprises a ring.

13. The mold roll assembly of claim 1, wherein the molding cavity comprises a crook portion.

14. The mold roll assembly of claim 13, wherein the crook portion of the molding cavity extends in a direction transverse to the mold roll assembly.

15. A mold roll assembly, comprising:
   an inner member; and
   a plurality of molding tools disposed about a circumference of the inner member, each molding tool comprising
      a plurality of plates arranged in a stack, at least some of the plates at least partially defining a molding cavity, wherein each of the plates defines an aperture, the apertures of the plates are substantially aligned with one another to at least partially form a bore that extends through the stack, and a mechanical fastener is disposed within the bore to retain the plates in a fixed position with respect to one another in the stack.

16. The mold roll assembly of claim 15, wherein the molding tools are releasably secured to the inner member.

17. The mold roll assembly of claim 16, further comprising a plurality of mechanical fasteners extending radially outward from the inner member, each of the plurality of mechanical fasteners that extend radially outward from the inner member being configured to be releasably fastened to a corresponding one of the molding tools.

18. The mold roll assembly of claim 17, wherein the plurality of mechanical fasteners comprise screws, and the plurality of molding tools define threaded bores configured to receive the screws.

19. The mold roll assembly of claim 15, wherein some of the plates are spacer plates and some of the plates are molding plates, each of the spacer plates being disposed between adjacent molding plates.

20. The mold roll assembly of claim 19, wherein the spacer plates cooperate with the molding plates to define molding cavities.

21. The mold roll assembly of claim 20, wherein each of the spacer plates defines an aperture, and the apertures of the molding plates and the spacer plates are substantially aligned with one another to form the bore in which the mechanical fastener is disposed.

22. The mold roll assembly of claim 21, wherein the portions of the molding plates and spacer plates defining the apertures are threaded, and the mechanical fastener is threaded to engage the threaded portions of the molding plates and spacer plates.

23. The mold roll assembly of claim 15, wherein the bore is threaded.

24. The mold roll assembly of claim 23, wherein the mechanical fastener comprises a screw.

25. The mold roll assembly of claim 15, wherein each molding tool further comprises a base defining a slot in which the plurality of plates are disposed.

26. The mold roll assembly of claim 25, wherein at least one of the plates is an L-shaped plate having a portion that overhangs an end portion of the base.

27. The mold roll assembly of claim 26, wherein the portion of the L-shaped plate that overhangs the end portion of the base at least partially defines a molding cavity.

28. The mold roll assembly of claim 25, wherein the base of the molding tool and the mechanical fastener are configured so that the mechanical fastener draws end portions of the base toward one another to compress the molding plates therebetween.

29. The mold roll assembly of claim 28, wherein at least one of the end portions of the base defines a threaded bore in which a threaded region of the mechanical fastener is disposed.

30. The mold roll assembly of claim 28, wherein the molding tools further comprise a plurality of spacer plates, each of the spacer plates being disposed between adjacent molding plates.

31. The mold roll assembly of claim 15, further comprising an end ring defining a recess configured to receive end portions of the plates.

32. The mold roll assembly of claim 31, wherein the end ring comprises a radially moveable member adapted to contact the end portion of one or more of the plates to enable a radial position of the one or more plates to be adjusted.

33. The mold roll assembly of claim 15, wherein the inner member comprises a drum.

34. The mold roll assembly of claim 15, wherein the inner member comprises a ring.

35. The mold roll assembly of claim 15, wherein the molding cavity comprises a crook portion extending in a direction transverse to the mold roll assembly.

36. A mold roll assembly, comprising:
a plurality of molding plates arranged circumferentially about an axis of rotation of the mold roll assembly, at least some of the molding plates defining a molding cavity;
an end ring defining a recess configured to receive end portions of the molding plates therein; and
members disposed within circumferentially spaced bores defined by the end ring, the members being configured to be moved radially inward and radially outward within the bores, each member being arranged to contact the end portion of one or more molding plates such that the member can be used to adjust a radial position of the one or more molding plates that the member is adapted to contact.

37. The mold roll assembly of claim 36, wherein the members comprise screws.

38. The mold roll assembly of claim 36, further comprising a ring disposed between the members and the end portions of the molding plates.

39. An apparatus, comprising:
a base having a peripheral surface;
a member extending radially outward from the base such that a molding tool defining a plurality of slots can be disposed adjacent the base with the member contacting an inner surface of a central portion of the molding tool; and
at least one mechanical fastener configured to engage end regions of the molding tool when the molding tool is disposed adjacent the base so that the end regions of the molding tool can be drawn radially inward toward the base, causing the slots to widen.

40. The apparatus of claim 39, wherein the mechanical fastener comprises a screw.

41. The apparatus of claim 39, wherein the member is radially moveable within a bore defined by the base.

42. The apparatus of claim 41, wherein the member comprises a screw.

43. The apparatus of claim 39, wherein the base comprises an inner member of a mold roll assembly.

44. A mold roll assembly, comprising:
an inner member; and
a plurality of molding tools disposed about a circumference of the inner member, each molding tool comprising a base defining a slot in which a plurality of plates arranged, wherein at least one of the plates is an L-shaped plate having a portion that overhangs an end portion of the base, and at least some of the plates are molding plates that at least partially define a molding cavity.

45. The mold roll assembly of claim 44, wherein the portion of the L-shaped plate that overhangs the end portion of the base at least partially defines a molding cavity.

46. The mold roll assembly of claim 44, wherein the molding tools are releasably secured to the inner member.

47. The mold roll assembly of claim 46, further comprising a plurality of mechanical fasteners extending radially outward from the inner member, each mechanical fastener being configured to be releasably fastened to a corresponding one of the molding tools.

48. The mold roll assembly of claim 47, wherein the plurality of mechanical fasteners comprise screws, and the plurality of molding tools define threaded bores configured to receive the screws.

49. The mold roll assembly of claim 44, wherein the molding tools comprise a plurality of molding plates and a plurality of spacer plates, each of the spacer plates being disposed between adjacent molding plates, and wherein the spacer plates cooperate with the molding plates to define the molding cavities.

50. The mold roll assembly of claim 44, further comprising an end ring defining a recess configured to receive end portions of the plates, wherein the end ring comprises a radially moveable member adapted to contact the end portion of one or more of the plates to enable a radial position of the one or more plates to be adjusted.

51. The mold roll assembly of claim 44, wherein the inner member comprises a drum.

52. The mold roll assembly of claim 44, wherein the inner member comprises a ring.

53. The mold roll assembly of claim 44, wherein the molding cavity comprises a crook portion extending in a direction transverse to the mold roll assembly.

* * * * *

UNITED STATES PATENT AND TRADEMARK OFFICE
CERTIFICATE OF CORRECTION

| | | |
|---|---|---|
| PATENT NO. | : 7,806,677 B2 | Page 1 of 1 |
| APPLICATION NO. | : 11/778271 | |
| DATED | : October 5, 2010 | |
| INVENTOR(S) | : Mark A. Clarner | |

It is certified that error appears in the above-identified patent and that said Letters Patent is hereby corrected as shown below:

Title page, item [57] Abstract column 2, line 2:
   delete "roll," and replace with --roll--.

Signed and Sealed this

Seventh Day of December, 2010

David J. Kappos
*Director of the United States Patent and Trademark Office*